United States Patent
Niewiadomski et al.

(10) Patent No.: US 11,390,294 B2
(45) Date of Patent: Jul. 19, 2022

(54) DIFFERENTIATING BETWEEN NEAR TRAILER AND CONNECTED TRAILER

(71) Applicant: Ford Global Technologies, LLC, Dearborn, MI (US)

(72) Inventors: Luke Niewiadomski, Dearborn, MI (US); Bruno Sielly Jales Costa, Santa Clara, CA (US); Nikhil Nagraj Rao, Cupertino, CA (US); Douglas J. Rogan, Mountain View, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 376 days.

(21) Appl. No.: 16/581,958

(22) Filed: Sep. 25, 2019

(65) Prior Publication Data

US 2021/0086785 A1   Mar. 25, 2021

(51) Int. Cl.
| | |
|---|---|
| *B60W 50/14* | (2020.01) |
| *B62D 13/06* | (2006.01) |
| *B60T 7/20* | (2006.01) |
| *B60W 10/20* | (2006.01) |
| *B60W 10/184* | (2012.01) |
| *B62D 15/02* | (2006.01) |

(52) U.S. Cl.
CPC .............. *B60W 50/14* (2013.01); *B60T 7/20* (2013.01); *B60W 10/184* (2013.01); *B60W 10/20* (2013.01); *B62D 13/06* (2013.01); *B62D 15/025* (2013.01); *B60W 2050/146* (2013.01)

(58) Field of Classification Search
None
See application file for complete search history.

(56) References Cited

U.S. PATENT DOCUMENTS

| | | | |
|---|---|---|---|
| 7,540,524 | B2 | 6/2009 | Viaud |
| 9,085,261 | B2 | 7/2015 | Lu et al. |
| 9,102,271 | B2 | 8/2015 | Trombley et al. |
| 9,779,313 | B2 | 10/2017 | Pliefke et al. |
| 9,821,845 | B2 | 11/2017 | Xu et al. |
| 9,914,333 | B2 * | 3/2018 | Shank ................ B62D 15/0285 |
| 9,987,892 | B2 | 6/2018 | Ghannam et al. |
| 10,059,161 | B1 | 8/2018 | Salter et al. |
| 2005/0074143 | A1 * | 4/2005 | Kawai .................... B62D 13/06 382/104 |

(Continued)

FOREIGN PATENT DOCUMENTS

CN         106864187 A      6/2017

*Primary Examiner* — Navid Z. Mehdizadeh
(74) *Attorney, Agent, or Firm* — Raymond Coppiellie; Price Heneveld LLP

(57) ABSTRACT

A system for assisting in aligning a vehicle for hitching with a trailer includes a steering system that adjusts a steering angle of the vehicle, a braking system that adjusts a speed of the vehicle, an imaging system that receives image data of a trailer disposed in an area proximate the vehicle, and a controller. The controller detects, within a threshold distance defined from a stationary point on the vehicle and the trailer, a position of a coupler from the image data, and, responsive to the position being less than the threshold distance, a status of the trailer based on the image data being indicative of a position of a hitch ball relative to the coupler within a second threshold. The controller maneuvers, via the steering and braking systems, the vehicle based on the status.

18 Claims, 14 Drawing Sheets

(56) References Cited

U.S. PATENT DOCUMENTS

| | | | |
|---|---|---|---|
| 2014/0200759 A1* | 7/2014 | Lu | B60C 9/005 |
| | | | 701/28 |
| 2015/0002669 A1* | 1/2015 | Reed | G07C 5/0808 |
| | | | 348/148 |
| 2016/0052548 A1* | 2/2016 | Singh | B60D 1/36 |
| | | | 701/37 |
| 2016/0288601 A1* | 10/2016 | Gehrke | G06K 9/6201 |
| 2019/0340787 A1* | 11/2019 | Ramirez Llanos | G06T 7/75 |

\* cited by examiner

DIFFERENTIATING BETWEEN NEAR TRAILER AND CONNECTED TRAILER

FIELD OF THE INVENTION

The present disclosure generally relates to a vehicle hitch assistance system. In particular, the disclosure relates to a hitch assist system integrated with a trailer backup assist system to classify and determine a status of a trailer.

BACKGROUND OF THE INVENTION

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstances, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause the vehicle to come into contact with the trailer. Accordingly, further advancements may be desired.

SUMMARY OF THE INVENTION

According to one aspect of the present disclosure, a vehicle for hitching with a trailer comprises a steering system that adjusts a steering angle of the vehicle, a braking system that adjusts a speed of the vehicle, an imaging system that receives image data of a trailer disposed in an area proximate the vehicle, and a controller. The controller detects, within a threshold distance defined from a stationary point on the vehicle and the trailer, a position of a coupler from the image data. The controller also detects, responsive to the position is less than the threshold distance, a status of the trailer based on the image data being indicative of a position of a hitch ball relative to the coupler within a second threshold, and maneuvers, via the steering and braking systems, the vehicle based on the status.

According to another aspect of the present disclosure, a vehicle comprises an imaging system that receives image data of a trailer and a controller. The controller detects, within a threshold distance defined from a stationary point on the vehicle and the trailer, a position of a coupler from the image data, and, responsive to the position is less than the threshold distance, a status of the trailer based on the image data being indicative of a position of a hitch ball relative to the coupler compared to a second threshold, that the controller maneuvers the vehicle based on the status with the steering and braking systems.

According to yet another aspect of the present disclosure, a method for aligning a vehicle for hitching with a trailer comprises detecting a trailer disposed in an area proximate a vehicle hitch in the image data from a vehicle imaging system, identifying a position of a coupler on the trailer from the image data being with a threshold distance, detecting, responsive to the position is less than the threshold distance, a status of the trailer based on the image data being indicative of a position of a hitch ball relative to the coupler compared to a second threshold; and maneuvering, via the steering and braking systems, the vehicle based on the status.

Embodiments of the first aspect of the invention can include any one or a combination of the following features:
 a steering system that adjusts a steering angle;
 a braking system that adjusts a speed;
 an imaging system that receives image data of a trailer;
 a controller that detects, within a threshold distance defined from a stationary point on the vehicle and the trailer, a position of a coupler from the image data; that detects, responsive to the position being less than the threshold distance, a status of the trailer based on the image data being indicative of a position of a hitch ball relative to the coupler within a second threshold, and that maneuvers, via the steering and braking systems, the vehicle based on the status;
 the imaging system includes a radar-based detection system to image the coupler and a camera to generate image data of the hitch ball;
 the controller is configured to transmit the status to a vehicle control sub-system;
 the status is determined through association of the image data with predetermined image data being indicative of each of the statuses and stored in the controller;
 the threshold distance is indicative of a distance from a center point of the hitch ball to a center point of the coupler;
 an interface configured to display the trailer and coupler from the image data such that an identifier highlights the trailer, wherein the identifier is adjustable on a display of the interface;
 the identifier is a window that surrounds the tongue or coupler and is adjustable such that the window is moveable to a second trailer tongue and coupler detected by the controller;
 an imaging system that receives image data of a trailer disposed in an area proximate a vehicle hitch;
 a controller that detects, within a threshold distance defined from a stationary point on the vehicle and the trailer, a position of a coupler from the image data, that detects, responsive to the position being less than the threshold distance, a status of the trailer based on the image data being indicative of a position of a hitch ball relative to the coupler compared to a second threshold, and that maneuvers, via the steering and braking systems, the vehicle based on the status;
 the imaging system includes a radar-based detection system to image the trailer and coupler, and a camera to generate image data of the hitch ball;
 the controller is configured to transmit the status to a vehicle control sub-system;
 the status is determined through association of the image data with predetermined image data indicative of each of the statuses being stored in the controller;
 the threshold distance is indicative of a distance from a center point of the hitch ball to a center point of the coupler;
 an interface that displays the trailer and coupler from the image data such that an identifier highlights the trailer, wherein the identifier is adjustable on a display of the interface;
 the identifier is a window that surrounds the trailer, and is adjustable such that the window is moveable to a second trailer detected by the controller;

detecting a trailer disposed in an area proximate a vehicle hitch in the image data from a vehicle imaging system;

identifying a position of a coupler on the trailer from the image data being with a threshold distance;

detecting, responsive to the position being less than the threshold distance, a status of the trailer based on the image data being indicative of a position of a hitch ball relative to the coupler compared to a second threshold;

maneuvering, via the steering and braking systems, the vehicle based on the status;

transmitting the status to a vehicle control sub-system;

the status is determined through association of the image data with predetermined image data of each of the statuses stored in the controller;

the threshold distance is indicative of a distance from a center point of the hitch ball to a center point of the coupler;

displaying on an interface of the trailer from the image data such that an identifier highlights the trailer, wherein the identifier is adjustable on a display of the interface; and adjusting the identifier being a window that surrounds the trailer such that the window is moveable to individual trailer components detected by the controller.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
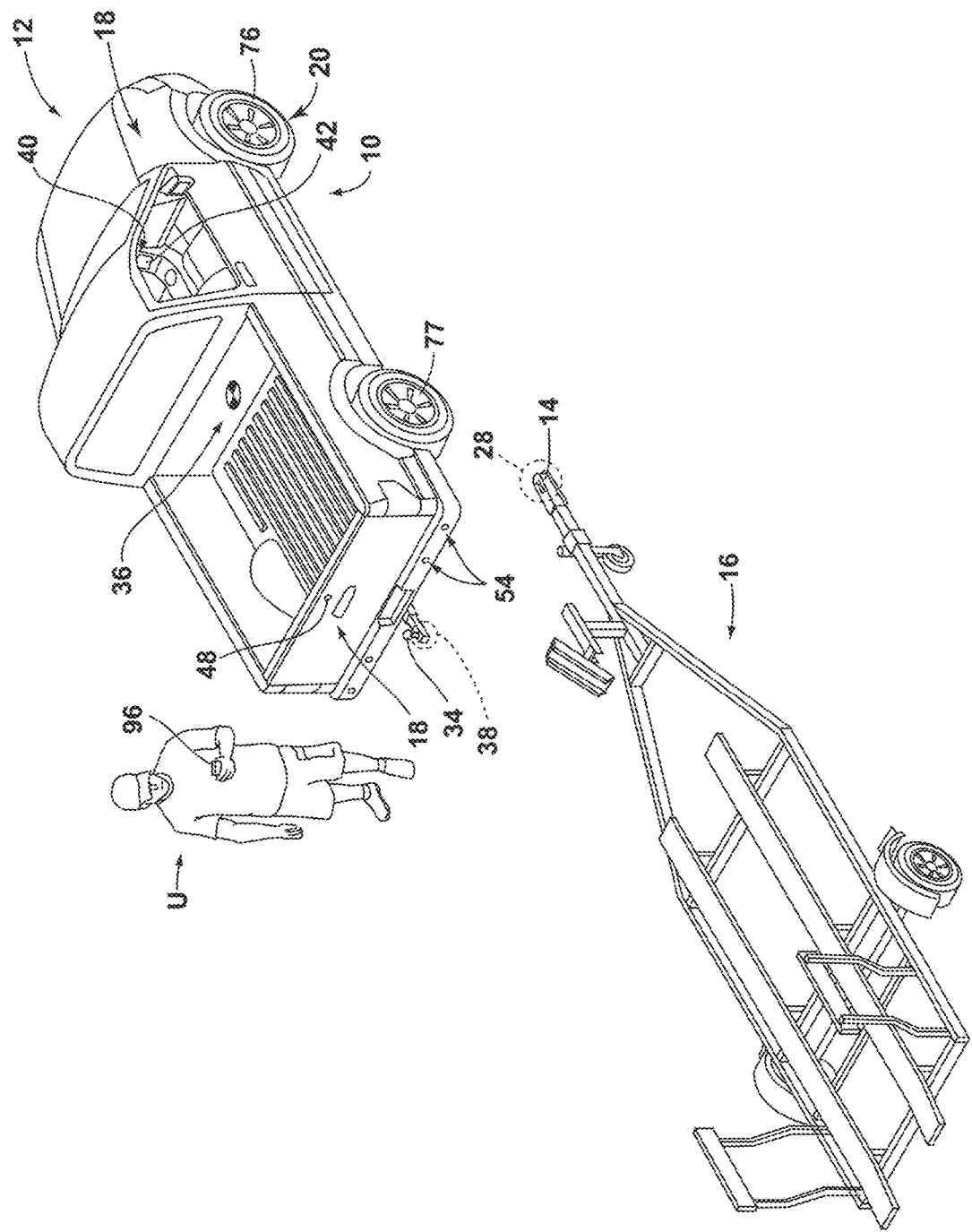
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction, or the like, does not mean that the feature or component follows a straight line or axis in such a direction or that it only extends in such direction or on such a plane without other directional components or deviations, unless otherwise specified.

Referring generally to FIGS. 1-6, reference numeral 10 designates a hitch assistance system (also referred to as a "hitch assist" system or a "hitching assistance" system) for a vehicle 12. With respect to the general operation of the hitch assist system 10, as illustrated in the system diagram of FIG. 2, system 10 includes various sensors and devices that obtain or otherwise provide vehicle status-related information. This information includes positioning information from a positioning system 22, which may include a dead-reckoning device 24 or, in addition or as an alternative, a global positioning system (GPS), to determine a coordinate location of the vehicle 12 based on the one or more locations of the devices within the positioning system 22. In particular, the dead-reckoning device 24 can establish and track the coordinate location of the vehicle 12 within a localized coordinate system 82 based at least on vehicle speed and steering angle δ. Other vehicle information received by hitch assist system 10 may include a speed of the vehicle 12 from a speed sensor 56 and a yaw rate of the vehicle 12 from a yaw rate sensor 58. It is contemplated that in additional embodiments, a proximity sensor array 54 or an array thereof, and other vehicle sensors and devices, may provide sensor signals or other information, such as sequential images of a trailer 16, including the detected coupler 14, that the controller 26 of the hitch assist system 10 may process with various routines to determine the height H and position of coupler 14.

Figure 2:
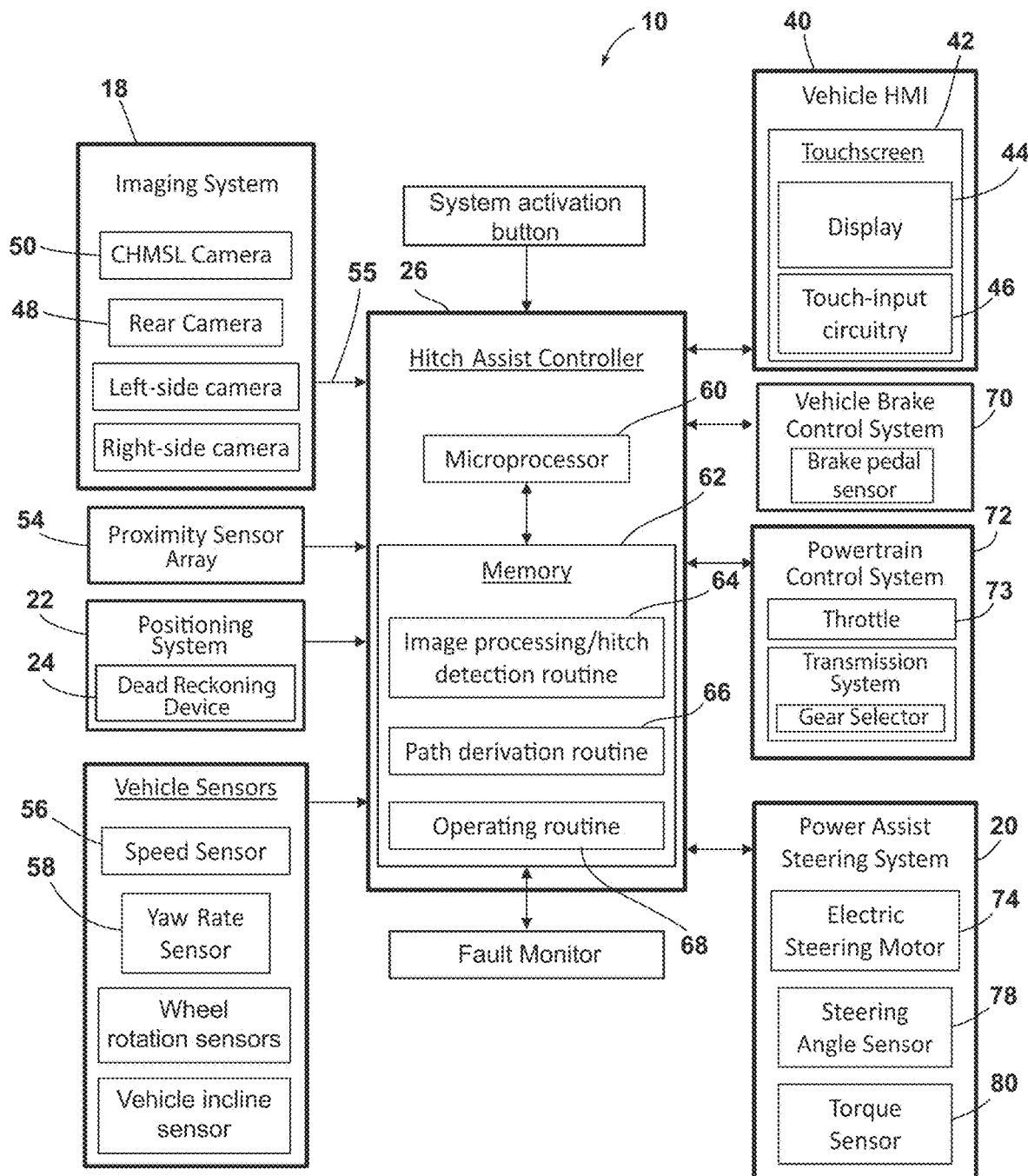
FIG. 2 is a diagram of a system, according to an aspect of the disclosure, for assisting in aligning the vehicle with a trailer in a position for hitching the trailer to the vehicle.

As further shown in FIG. 2, one embodiment of the hitch assist system 10 is in communication with the steering system 20 of vehicle 12, which may be a power assist steering system 20 including an electric steering motor 74 to operate the steered wheels 76 (FIG. 1) of the vehicle 12 for moving the vehicle 12 in such a manner that the vehicle yaw changes with the vehicle velocity and the steering angle δ. In the illustrated embodiment, the power assist steering system 20 is an electric power-assisted steering ("EPAS") system including electric steering motor 74 for turning the steered wheels 76 to a steering angle δ based on a steering command, whereby the steering angle δ may be sensed by a steering angle sensor 78 of the power assist steering system 20. The steering command may be provided by the hitch assist system 10 for autonomously steering during a trailer hitch alignment maneuver and may, alternatively, be provided manually via a rotational position (e.g., steering wheel angle) of a steering wheel of vehicle 12. However, in the illustrated embodiment, the steering wheel of the vehicle 12 is mechanically coupled with the steered wheels 76 of the vehicle 12, such that the steering wheel moves in concert with steered wheels 76, preventing manual intervention with the steering wheel during autonomous steering. More specifically, a torque sensor 80 is provided on the power assist steering system 20 that senses torque on the steering wheel that is not expected from autonomous control of the steering wheel and, therefore, indicative of manual intervention, whereby the hitch assist system 10 may alert the driver to discontinue manual intervention with the steering wheel and/or discontinue autonomous steering. In alternative embodiments, some vehicles have a power assist steering system 20 that allows a steering wheel to be partially decoupled from movement of the steered wheels 76 of such a vehicle.

Figure 3:
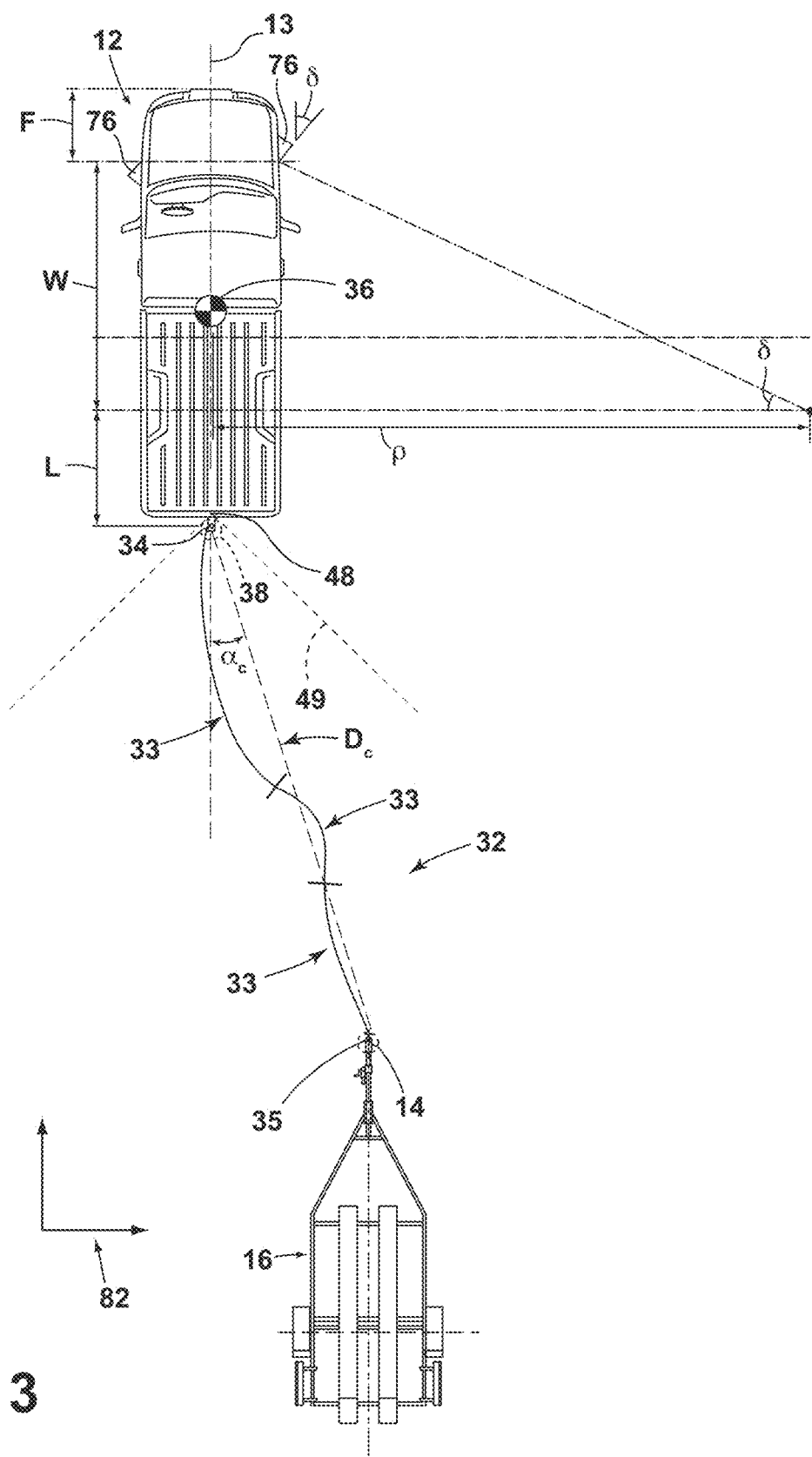
FIG. 3 is an overhead schematic view of a vehicle during a step of the alignment sequence with the trailer.

With continued reference to FIG. 2, the power assist steering system 20 provides the controller 26 of the hitch assist system 10 with information relating to a rotational position of steered wheels 76 of the vehicle 12, including a steering angle $\delta$. The controller 26, in the illustrated embodiment, processes the current steering angle, in addition to other vehicle 12 conditions, to guide the vehicle 12 along the desired path 32 (FIG. 3). It is conceivable that the hitch assist system 10, in additional embodiments, may be an integrated component of the power assist steering system 20. For example, the power assist steering system 20 may include a hitch assist algorithm for generating vehicle steering information and commands as a function of all or a portion of information received from the imaging system 18, the power assist steering system 20, a vehicle brake control system 70, a powertrain control system 72, and other vehicle sensors and devices, as well as a human-machine interface 40, as discussed further below.

As also illustrated in FIG. 2, the vehicle brake control system 70 may also communicate with the controller 26 to provide the hitch assist system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, among other conceivable means. In some embodiments, individual wheel speeds can also be used to determine a vehicle yaw rate $\dot{\gamma}$, which can be provided to the hitch assist system 10 in the alternative or in addition to the vehicle yaw rate sensor 58. The hitch assist system 10 can, further, provide vehicle braking information to the brake control system 70 for allowing the hitch assist system 10 to control braking of the vehicle 12 during backing of the trailer 16. For example, the hitch assist system 10, in some embodiments, may regulate speed of the vehicle 12 during alignment of the vehicle 12 with the coupler 14 of trailer 16, which can reduce the potential for contact with trailer 16, and can bring vehicle 12 to a complete stop at a determined endpoint 35 of path 32. It is disclosed herein that the hitch assist system 10 can additionally or alternatively issue an alert signal corresponding to a notification of an actual, impending, and/or anticipated contact with a portion of trailer 16. The powertrain control system 72, as shown in the embodiment illustrated in FIG. 2, may also interact with the hitch assist system 10 for regulating speed and acceleration of the vehicle 12 during partial or autonomous alignment with trailer 16. As mentioned above, regulation of the speed of the vehicle 12 may be advantageous to prevent contact with trailer 16.

Additionally, the hitch assist system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like, can be used in place or in addition to touchscreen 42. Further, the hitch assist system 10 may communicate via wireless communication with another embodiment of the HMI 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 on the display 44 and may be further able to receive remote user inputs via touchscreen circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the imaging system 18, the power assist steering system 20, the vehicle brake control system 70, the powertrain control system 72, and other vehicle sensors and devices. The controller 26 may generate vehicle steering information and commands as a function of all or a portion of the information received. Thereafter, the vehicle steering information and commands may be provided to the power assist steering system 20 for affecting steering of the vehicle 12 to achieve a commanded path 32 (FIG. 3) of travel for alignment with the coupler 14 of trailer 16. The controller 26 may include the microprocessor 60 and/or other analog and/or digital circuitry for processing one or more routines. Also, the controller 26 may include the memory 62 for storing one or more routines, including an image processing routine 64 and/or hitch detection routine, a path derivation routine 66, and an operating routine 68. It should be appreciated that the controller 26 may be a stand-alone dedicated controller or may be a shared controller integrated with other control functions, such as integrated with a vehicle sensor system, the power assist steering system 20, and other conceivable on-board or off-board vehicle control systems. It should further be appreciated that the image processing routine 64 may be carried out by a dedicated processor, for example, within a stand-alone imaging system for vehicle 12 that can output the results of its image processing to other components and systems of vehicle 12, including microprocessor 60. Further, any system, computer, processor, or the like, that completes image processing functionality, such as that described herein, may be referred to herein as an "image processor" regardless of other functionality it may also implement (including simultaneously with executing image processing routine 64).

System 10 can also incorporate an imaging system 18 that includes one or more exterior cameras, which, in the illustrated examples, include rear camera 48, center high-mount stoplight (CMHSL) camera 50, and side-view cameras, although other arrangements including additional or alternative cameras are possible. In one example, imaging system 18 can include rear camera 48 alone or can be configured such that system 10 utilizes only rear camera 48 in a vehicle with multiple exterior cameras. In another example, the various cameras 48, 50 included in imaging system 18 can be positioned to generally overlap in their respective fields of view, which may correspond with rear camera 48, center high-mount stoplight (CMHSL) camera 50, and side-view cameras, respectively. In this manner, image data 55 from two or more of the cameras can be combined in image processing routine 64, or in another dedicated image processor within imaging system 18, into a single image. In an extension of such an example, the image data 55 can be used to derive stereoscopic image data that can be used to reconstruct a three-dimensional scene of the area or areas within overlapped areas of the various fields of view 49, including any objects (obstacles or coupler 14, for example) therein. In an embodiment, the use of two images including the same object can be used to determine a location of the object relative to the two image sources, given a known spatial relationship between the image sources. In this respect, the image processing routine 64 can use known programming and/or functionality to identify an object within image data 55 from the various cameras 48, 50 within imaging system 18. In either example, the image processing routine 64 can include information related to the positioning of any cameras 48, 50 present on vehicle 12 or utilized by system 10, including relative to the center 36 (FIG. 1) of vehicle 12, for example, such that the positions of cameras 48, 50 relative to center 36 and/or to each other can be used for object positioning calculations and to result in object position data relative to the center 36 of vehicle 12, for example, or other features of vehicle 12, such as hitch ball 34 (FIG. 1), with known positions relative to center 36. In one aspect, the various systems and vehicle features discussed herein, including imaging system 18, positioning system 22, brake control system 70, powertrain control system 72, power assist steering system 20, proximity sensor array 54, positioning system 22, and the vehicle sensors discussed herein may generally be used for purposes of vehicle control, such as under control of the user, including potentially with assistance of an on-board computer or other processor communicating with the systems and features. In this manner, the systems and features can be referred to collectively as a vehicle control system that may be utilized by controller 26 for the automatic vehicle control functionality discussed herein.

The image processing routine 64 can be specifically programmed or otherwise configured to locate coupler 14 within image data 55. In an example, the image processing routine 64 can first attempt to identify any trailers 16 within the image data 55, which can be done based on stored or otherwise known visual characteristics of trailer 16, of a number of different types, sizes or configurations of trailers compatible with system 10, or trailers, in general. Controller 26 can seek confirmation from the user that the identification of the trailer 16 is accurate and is the correct trailer for which to complete an assisted hitching operation, as described further below. After the trailer 16 is identified, controller 26 may then identify the coupler 14 of that trailer 16 within the image data 55 based, similarly, on stored or otherwise known visual characteristics of coupler 14 or couplers, in general. In another embodiment, a marker in the form of a sticker, or the like, may be affixed with trailer 16 in a specified position relative to coupler 14 in a manner similar to that which is described in commonly-assigned U.S. Pat. No. 9,102,271, the entire disclosure of which is incorporated by reference herein. In such an embodiment, image processing routine 64 may be programmed with identifying characteristics of the marker for location in image data 55, as well as the positioning of coupler 14 relative to such a marker so that the position 28 of coupler 14 can be determined based on the marker location. Additionally, or alternatively, controller 26 may seek confirmation of the determined coupler 14, via a prompt on touchscreen 42. If the coupler 14 determination is not confirmed, further image processing may be provided, or user-adjustment of the position 28 of coupler 14 may be facilitated, either using touchscreen 42 or another input to allow the user to move the depicted position 28 of coupler 14 on touchscreen 42, which controller 26 uses to adjust the determination of position 28 of coupler 14 with respect to vehicle 12 based on the above-described use of image data 55.

In various examples, controller 26 may initially rely on the identification of trailer 16 for the initial stages of an automated hitching operation, with the path 32 being derived to move the hitch ball 34 toward a centrally aligned position with respect to trailer 16 with the path 32 being refined once the coupler 14 is identified. Such an operational scheme can be implemented when it is determined that trailer 16 is at a far enough distance from vehicle 12 to begin backing without knowing the precise endpoint 35 of path 32 and can be useful when trailer 16 is at a distance where the resolution of the image data 55 makes it possible to accurately identify trailer 16, but at which the coupler 14 cannot be precisely identified. In this manner, initial rearward movement of vehicle 12 can allow for calibration of various system 10 inputs or measurements that can improve the accuracy of distance measurements, for example, that can help make coupler 14 identification more accurate. Similarly, movement of vehicle 12 resulting in a change to the particular image within the data 55 that can improve the resolution or move the coupler 14 relative to the remaining portions of trailer 16 such that it can be more easily identified.

As shown in FIG. 3, the image processing routine 64 and operating routine 68 may be used in conjunction with each other to determine the path 32 along which hitch assist system 10 can guide vehicle 12 to align hitch ball 34 and coupler 14 of trailer 16. Upon initiation of hitch assist system 10, such as by user input on touchscreen 42, for example, image processing routine 64 can identify coupler 14 within the image data 55 and at least attempt to estimate the position 28 of coupler 14 relative to hitch ball 34 using the image data 55 in accordance with one of the examples discussed above to determine a distance $D_c$ to coupler 14 and an angle $\alpha_c$ of offset between a line connecting hitch ball 34 and coupler 14 and the longitudinal axis of vehicle 12. Image processing routine 64 can also be configured to identify the trailer 16 overall and can use the image data of trailer 16, alone or in combination with the image data of coupler 14, to determine the orientation or heading 33 of trailer 16. In this manner, the path 32 can further be derived to align vehicle 12 with respect to trailer 16 with the longitudinal axis 13 of vehicle 12 within a predetermined angular range of the heading 33 of trailer 16. Notably, such alignment may not require that the longitudinal axis 13 of vehicle 12 is parallel or collinear with the heading 33 of trailer 16, but may simply be within a range that generally allows connection of hitch ball 34 with coupler 14 without contact between vehicle 12 and trailer 16 and may further allow immediate controlled backing of trailer 16 using vehicle 12. In this manner, the angular range may be such that the alignment of vehicle 12 with trailer 16 at the end of the operating routine 68 is such that the angle between longitudinal axis 13 and heading 33 is less than the jackknife angle between the vehicle 12 and trailer 16 when coupled or a reasonable estimate thereof. In one example, the angular range may be such that longitudinal axis 13 is within about 30° from collinear with heading 33 in either direction.

Continuing with reference to FIG. 3 with additional reference to FIG. 2, controller 26, having estimated the positioning $D_c$, $\alpha_c$ of coupler 14, as discussed above, can, in one example, execute path derivation routine 66 to determine vehicle path 32 to align the vehicle hitch ball 34 with coupler 14. In particular, controller 26 can have stored in memory 62 various characteristics of vehicle 12, including the wheelbase W, the distance from the rear axle to the hitch ball 34, which is referred to herein as L, as well as the maximum angle to which the steered wheels 76 can be turned $\delta_{max}$. As shown, the wheelbase W and the current steering angle δ can be used to determine a corresponding turning radius ρ for vehicle 12 according to the equation:

$$\rho = W/\tan \delta, \quad (1)$$

in which the wheelbase W is fixed and the steering angle δ can be controlled by controller 26 by communication with steering system 20, as discussed above. In this manner, when the maximum steering angle $\delta_{max}$ is known, the smallest possible value for the turning radius $\rho_{min}$ is determined as:

$$\rho_{min} = W/\tan \delta_{max}. \quad (2)$$

Path derivation routine 66 can be programmed to derive vehicle path 32 to align a known location of the vehicle hitch ball 34 with the estimated position 28 of coupler 14 that takes into account the determined minimum turning radius $\rho_{min}$ to allow path 32 to use the minimum amount of space and maneuvers. In this manner, path derivation routine 66 can use the position of vehicle 12, which can be based on the center 36 of vehicle 12, a location along the rear axle, the location of the dead-reckoning device 24, or another known location on the coordinate system 82, to determine both a lateral distance to the coupler 14 and a forward or rearward distance to coupler 14 and derive a path 32 that achieves the needed lateral and forward-backward movement of vehicle 12 within the limitations of steering system 20. The derivation of path 32 further takes into account the positioning of hitch ball 34, based on length L, relative to the tracked location of vehicle 12 (which may correspond with the center 36 of the mass of vehicle 12, the location of a GPS receiver, or another specified, known area) to determine the needed positioning of vehicle 12 to align hitch ball 34 with coupler 14. It is noted that hitch assist system 10 can compensate for horizontal movement Δx of coupler 14 in a driving direction by determining the movement of coupler 14 in the vertical direction Δy that will be needed to receive hitch ball 34 within coupler 14. Such functionality is discussed further in co-pending, commonly-assigned U.S. Pat. Nos. 9,821,845 and 10,870,323, the entire disclosures of which are hereby incorporated by reference herein.

As discussed above, once the desired path 32, including endpoint 35, has been determined, controller 26 is then allowed to at least control the steering system 20 of vehicle 12 with the powertrain control system 72 and the brake control system 70 (whether controlled by the driver or by controller 26, as discussed below) controlling the velocity (forward or rearward) of vehicle 12. In this manner, controller 26 can receive data regarding the position of vehicle 12 during movement thereof from positioning system 22 while controlling steering system 20, as needed, to maintain vehicle 12 along path 32. In particular, the path 32, having been determined based on the vehicle 12 and the geometry of steering system 20, can adjust the steering angle δ, as dictated by path 32, depending on the position of vehicle 12 therealong. It is additionally noted that in an embodiment, the path 32 may comprise a progression of steering angle δ adjustment that is dependent on the tracked vehicle position.

As illustrated in FIG. 3, vehicle path 32 can be determined to achieve the needed lateral and rearward movement within the smallest area possible and/or with the lowest number of maneuvers. In the illustrated example of FIG. 3, path 32 can include two portions defined by steering of wheels 76 in different directions to collectively traverse the needed lateral movement of vehicle 12, while providing a final straight, rearward backing segment to bring hitch ball 34 into the above-described offset alignment with coupler 14. It is noted that variations in the depicted path 32 may be used. It is further noted that the estimates for the positioning $D_c$, $\alpha_c$ of coupler 14 may become more accurate as vehicle 12 traverses path 32, including to position vehicle 12 in front of trailer 16 and as vehicle 12 approaches coupler 14. Accordingly, such estimates can be continuously derived and used to update path derivation routine 66, if necessary, in the determination of the adjusted endpoint 35 for path 32, as discussed above. In a similar manner, the path 32, as derived using the position and orientation data acquired from a portable device 96, such as a smartphone, can be fine-tuned once the image processing routine 64 can identify coupler 14 in the image data 55, with continued updates for path 32 being similarly derived as the image data 55 becomes increasingly clear during the approach toward trailer 16. It is further noted that, until such a determination can be made, the dead-reckoning device 24 can be used to track the location of vehicle 12 in its movement along path 32 toward the initially-derived endpoint 35.

Figure 4:
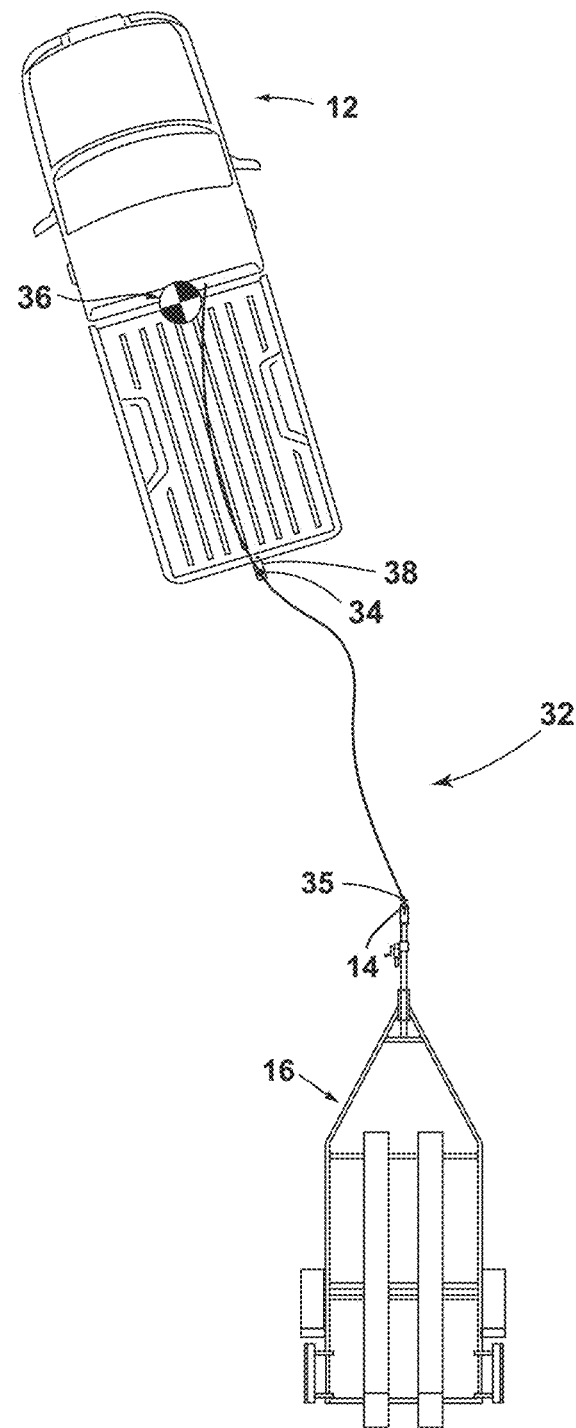
FIG. 4 is an overhead schematic view of the vehicle during a subsequent step of the alignment sequence with the trailer.
Figure 5:
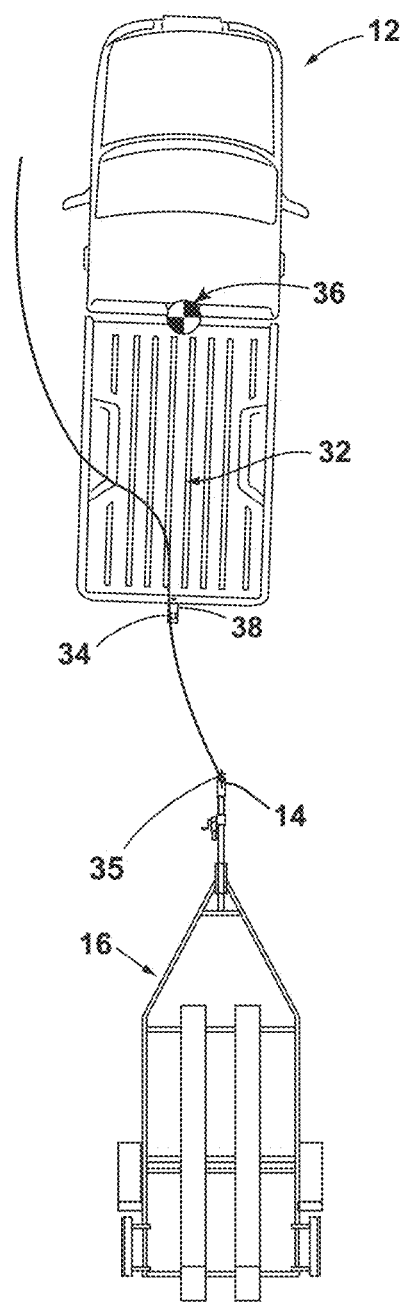
FIG. 5 is an overhead schematic view of the vehicle during a subsequent step of the alignment sequence with the trailer.
Figure 6:
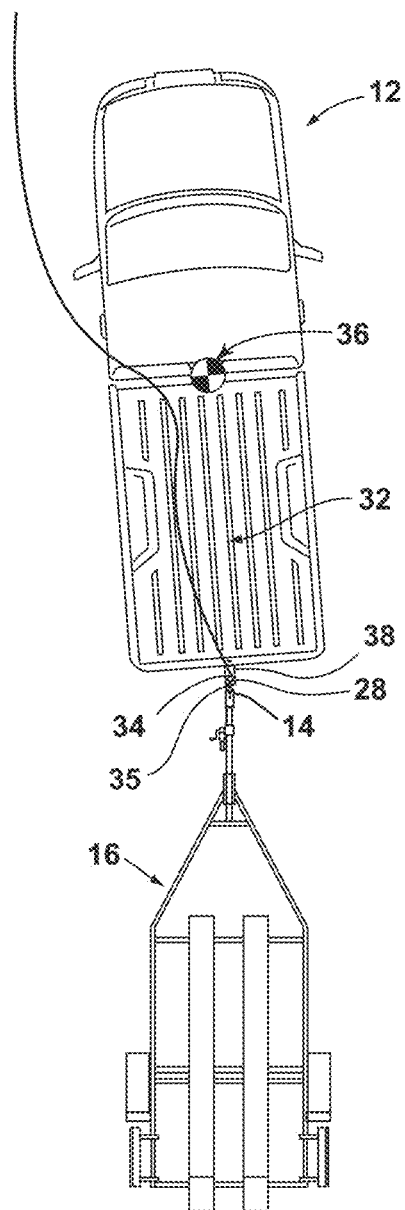
FIG. 6 is an overhead schematic view of the vehicle during a subsequent step of the alignment sequence with the trailer and showing the position of a hitch ball of the vehicle at an end of a derived alignment path.
Figure 7A:
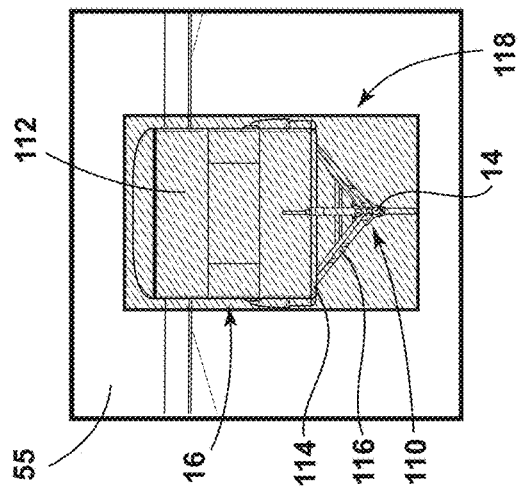
FIGS. 7A-7F are rear perspective views of an image of a trailer being segregated by a trailer component.
Figure 7B:
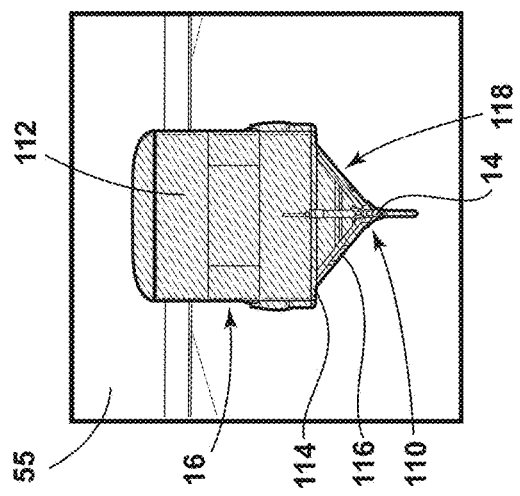
Figure 7C:
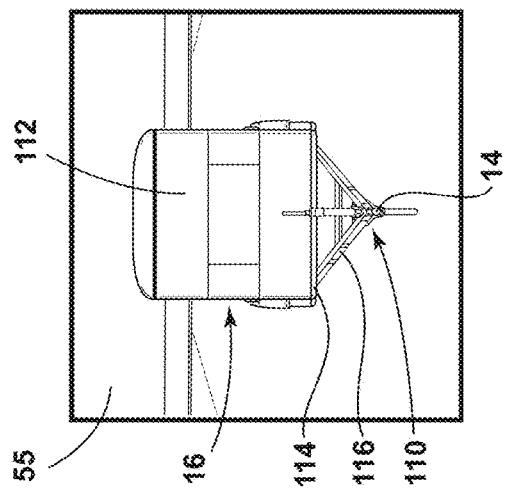
Figure 7D:
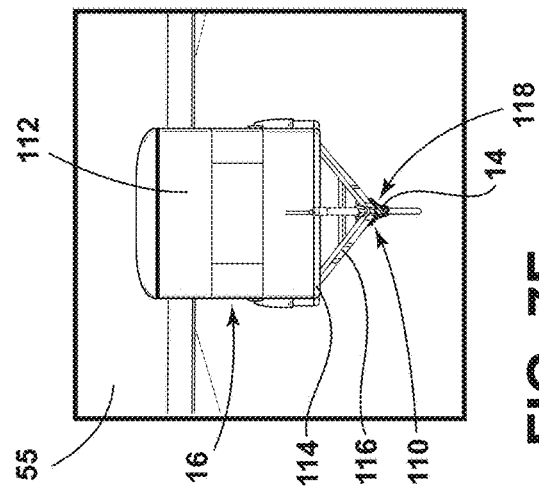
Figure 7E:
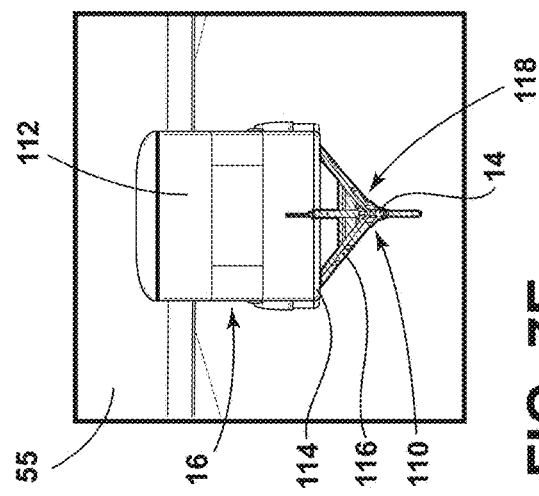
Figure 7F:
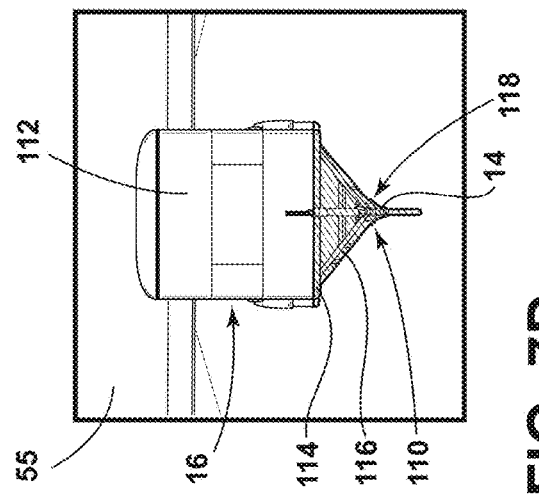

As shown in FIGS. 4-6, once the trailer 16 and coupler 14 have been identified, and system 10 determines the path 32 to align hitch ball 34 with the coupler 14, the controller 26 executing operating routine 68 may continue to control vehicle 12 until hitch ball 34 is in the desired endpoint 35 relative to coupler 14 for coupler 14 to engage with hitch ball 34 when coupler 14 is lowered into horizontal alignment therewith. In the example discussed above, image processing routine 64 continuously monitors the positioning $D_c$, $\alpha_c$ of coupler 14, constantly or once available, during execution of operating routine 68, including as coupler 14 comes into clearer view of rear camera 48, with continued movement of vehicle 12 along path 32. As discussed above, the position of vehicle 12 can also be monitored by dead-reckoning device 24 with the position 28 of coupler 14 being continuously updated and fed into path derivation routine 66 in case path 32 and/or endpoint 35 can be refined or should be updated (due to, for example, improved height $H_c$, distance $D_c$, or offset angle $\alpha_c$ information due to closer resolution or additional image data 55), including as the vehicle 12 moves closer to the trailer 16, as shown in FIGS. 4 and 5. Still further, the coupler 14 can be assumed to be static such that the position of the vehicle 12 can be tracked by continuing to track the coupler 14 to remove the need for use of the dead-reckoning device 24. In a similar manner, a modified variation of operating routine 68 can progress through a predetermined sequence of maneuvers involving steering of vehicle 12 at or below a maximum steering angle $\delta_{max}$, while tracking the position $D_c$, $\alpha_c$ of coupler 14 to converge the known relative position of hitch ball 34 to the desired position 38 thereof relative to the tracked position 28 of coupler 14, as discussed above and shown in FIG. 6.

During an assisted hitching operation, such as in the example described with respect to FIGS. 4-6, system 10 requires a minimum amount of longitudinal distance between the vehicle 12 and the trailer 16 to control movement of vehicle 12 with a level of precision desired to achieve the desired final position of hitch ball 34 with respect to coupler 14 (i.e., without overshooting the desired final location, such that hitch ball 34 moves past the coupler 14, or otherwise ending operating routine 68 with hitch ball 34 positioned relative to coupler 14 such that manual movement of trailer 16 is required). The required minimum distance can vary but is generally influenced by the requirements of image processing routine 64, as well as the requirements of speed sensor 56, the responsiveness of the throttle 73 and vehicle brake control system 70, as well as the general processing speed of controller 26 of other components of system 10. In one example, image processing routine 64 may require a minimum travel distance for calibration thereof, including to accurately identify coupler 14 and to assist in tracking the movement of vehicle 12. As discussed further below, the particular minimum distance can be estimated for a given implementation of system 10, based on known values or estimates for such factors. In general, because of the minimum travel distance requirement, if vehicle 12 is at a standstill with insufficient longitudinal distance remaining between hitch ball 34 and coupler 14, the system 10 is programmed to either not initiate operating routine 68 or, if already started, abort operating routine 68 to avoid overshooting the final target position such that hitch ball 34 moves past endpoint 35. In various examples, vehicle 12 may be brought to a standstill for reasons other than operating routine 68 causing the application of the vehicle brakes 70. In particular, vehicle 12 may come to a standstill before reaching the desired final target position due to uneven terrain acting on the vehicle wheels 76 or 77, or by the vehicle brakes 70 being manually applied by the driver. Because such events can cause a vehicle 12 standstill at any point along path 32, the present system 10 provides the ability to detect such a standstill event and to address it appropriately given the capabilities and requirements of system 10. In various examples, system 10 can address an early standstill by aborting, pausing, or automatically rectifying the standstill condition.

As mentioned above, the "longitudinal control" in an assisted hitching maneuver is the portion of vehicle 12 movement along path 32 controlled by the vehicle powertrain control system 72 and the vehicle brake system 70 with the "longitudinal control" being the portion controlled by the power assist steering system 20. It is to be understood that the lateral control requires movement of the vehicle such that the two control schemes operate together to move vehicle 12 along the path 32. In this respect, the longitudinal alignment of the path 32 with the coupler 14 is dictated by the longitudinal control (i.e., by the steering system 20) and the final stopping point of vehicle 12 along path 32 is dictated by the longitudinal control. In this respect, the final stopping point of the vehicle 12 along path 32 determines the alignment in the direction of travel between hitch ball 34 and coupler 14. In this manner, system 10 may be able to move vehicle 12 to the final target position in a precise manner, for example, such that trailer 16 does not have to be manually repositioned by the user, but can simply be lowered onto hitch ball 34. In one implementation of system 10, the accuracy in final longitudinal alignment of hitch ball 34 with coupler 14 can be to within 1 cm of a completely aligned position (center-to-center).

There are a number of events that can cause vehicle 12 to reach a standstill during an assisted hitching maneuver before reaching the final target position. As discussed above, controller 26 executing operating routine 68 does not directly cause vehicle 12 to stop until it is determined that the vehicle 12 has reached the final target position with the hitch ball 34 aligned with the endpoint 35; however, various operating conditions may cause the vehicle 12 to inadvertently reach a standstill during operation. Notably, during execution of operating routine 68, a low speed of the vehicle 12 is maintained (at least within the final 1 to 2 m of the final target position, as determined by the distance between hitch ball 34 and endpoint 35) to allow for precise stopping in the desired position 38d at the end of the operation. At such low speeds, the vehicle 12 carries a lower inertia and is driven by a lower torque output of the engine such that the vehicle 12 may be brought to a standstill by uneven terrain, or by driver-applied braking (even at a generally light application pressure). In one example, the vehicle speed during at least the latter stages of operating routine 68 execution may be on the order of 0.1 kph. In an example, an assisted hitching maneuver may occur off of a paved surface, including on uneven terrain that can easily bring the vehicle to a stop (i.e. bumps, pits, rocks). In other examples, the vehicle 12 may encounter debris or other articles or defects (rocks, cracks, potholes, bumps) in a paved driving surface that may disrupt vehicle movement. Still further, drivers may habitually contact or grasp the steering wheel or depress the brake pedal during vehicle movement, especially when vehicle 12 is close to the trailer 16 where they may not be able to visualize the hitch ball 34 or coupler 14.

Referring specifically to FIGS. 7A-7F, the hitch assist system 10 may be able to identify and classify the trailer 16 as well as trailer components 110. The hitch assist system 10 detects and tracks the trailer 16 and trailer components 110 in FIGS. 7A-7B. The hitch assist system 10 separately classifies specific components 110 of the trailer 16, for example, but not limited to a body 112, base 114, tongue 116, and the coupler 14 in FIGS. 7C-7F. Separately classifying the specific components 110 for a trailer 16 may be used to enhance abort or inhibit logic to ensure maneuvers with the trailer 16, reduces potential for false positive detections, improves alignment at the endpoint 35 of the maneuver due to enhanced judgment of the trailer 16, and improved HMI ("Human Machine Interface") feedback to the user including by providing an identifier 118 around the trailer 16 and/or each of the trailer components 110. The hitch assist system 10 systematically classifies the specific components 110 of the trailer 16, and uses component data to estimate the endpoint 35.

For example, if the coupler 14 is not classified, such as by image data 55 being of a resolution such that coupler 14 cannot be confidently identified, the tongue 116 may be classified to estimate the endpoint 35, such as by aligning endpoint 35 at the end of the classified tongue 116 and contour matching algorithms. Likewise, if the tongue 116 is not classified, the base 114 may be classified to estimate the endpoint 35, such as by using an estimation of a pose of the base 144 and can proceed by the estimation being greater than the confidence threshold. If the base 114 is not classified, the hitch assist system 10 determines a presence of a trailer 16 or trailer-like object. A trailer-like object may be any object having similar features, characteristics, or other similarities to the trailer 16. The hitch assist system 10 inhibits operation, if a trailer 16 is not classified differently than a trailer-like object (not shown). This aids to prevent use on non-trailers, and improves an ability of the hitch assist system 10 to detect a trailer 16, since the hitch assist system 10 may perceive the trailer 16 separately from a trailer-like object. The system may also abort the maneuver if the tongue is not classified within a first distance threshold to the trailer 16.

Figure 8:
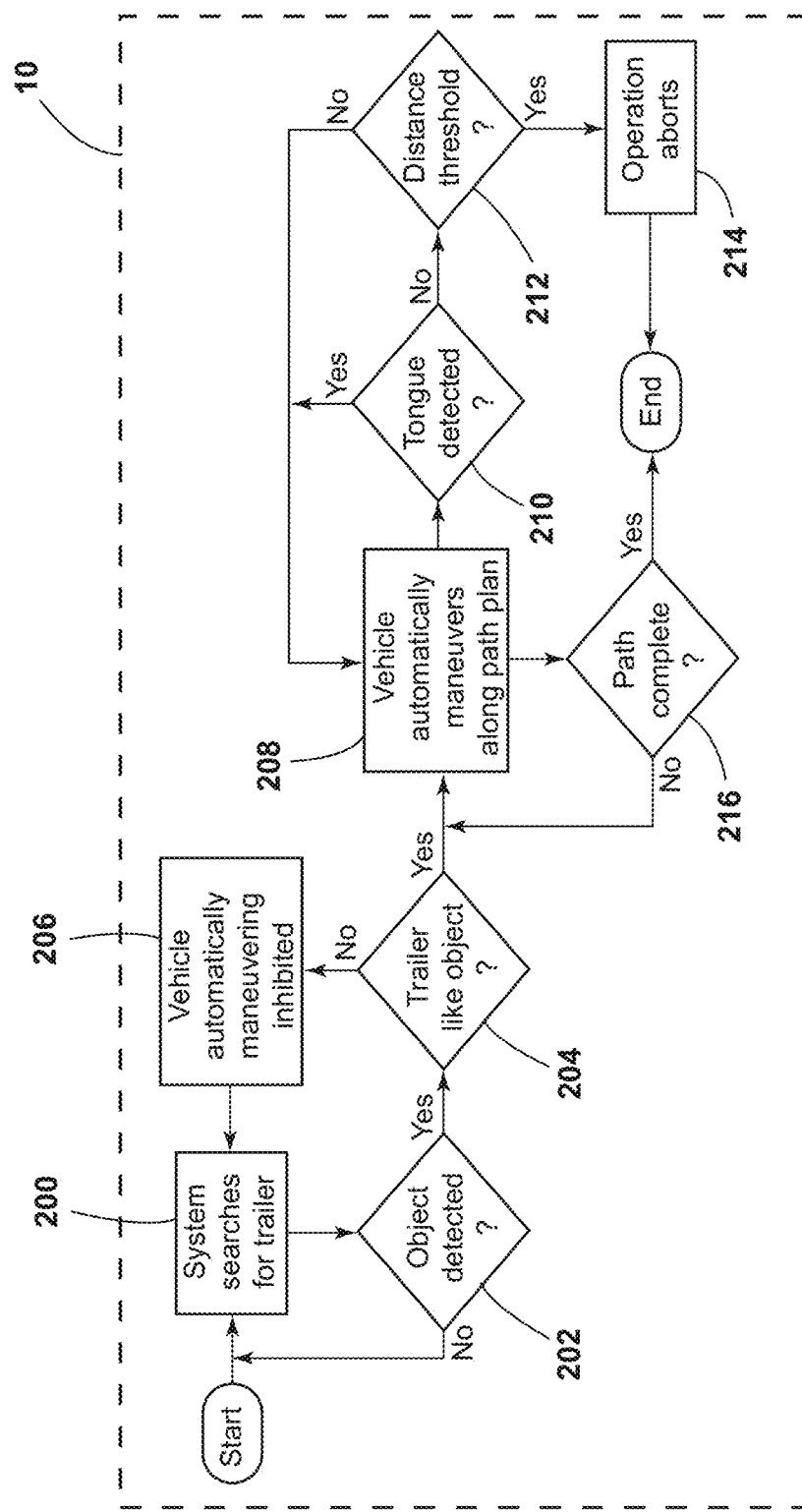
FIG. 8 is a control logic flow diagram depicting a trailer identification and classification scheme.

FIG. 8 depicts control logic showing how the hitch assist system 10 may combine classifications of the trailer components 110 to inhibit automated maneuvers below a first threshold indicative of the minimum distance previously described. The hitch assist system 10 combines different classifications, such as, for example, between the trailer-like object and the trailer, and between the base 114, tongue 116, and coupler 14. The hitch assist system 10 uses classifications to inhibit the automatic maneuver if the classification is based on an evaluation with an assigned confidence less than a confidence threshold. Also, the hitch assist system 10 aborts the maneuver if the tongue 116 is not classified to a confidence within the first threshold. At 200, the imaging system 18 uses sensor-processing techniques on the image data 55, such as, but not limited to, camera and ultrasonic radar processing, to search for a trailer 16. The imaging system 18 may detect a generic object at 202. At 202, the hitch assist system 10 may assign a classification to the detected object being a fixed object of substantial size, which may be detected by radar reflections. If at 202, the hitch assist system 10 detects an object, the hitch assist system 10 determines if the object is a trailer-like object at 204.

At 204, certain criteria are used, such as a triangular pattern in the image data 55, a size constraint within the image data 55, a rectangular shape in the image data 55, and any other characteristics or features indicative of the trailer 16, to determine if the object is a trailer-like object. The imaging system 18 may also be trained using machine learning to provide an estimation of a trailer appearance, while capturing a variety of trailer appearances based on a process of trailer data collection and manual annotation. At 204, the hitch assist system 10 may be designed to detect many trailer-like objects, depending on confidence thresholds associated with classification. This process avoids a non-detection of trailers 16 in situations where misidentification is of less consequence (i.e., when movement of vehicle 12 toward trailer 16 may improve or result in an accurate detection with room to maneuver vehicle 12 to an updated endpoint 35. The user may also determine if a trailer-like object is detected at 204, based on an identifier 118 provided on the display 44 of the interface 40, discussed below in more detail. At 204, if the detected object is not similar to a trailer 16 to be classified as a trailer-like object, the hitch assist system 10 inhibits the maneuver until a trailer-like object is detected at 206. If at 204, the hitch assist system does detect a trailer-like object, the hitch assist system 10 proceeds to automatically maneuver the vehicle using the steering and braking systems 20, 70 along the path 32 toward the trailer-like object at 208. For example, at 208 the path 32 is determined based on an estimation of a coupler position and a detected position of a hitch ball 34, as described previously. The hitch assist system 10 controls (at 206) vehicle speed and steering using the braking and steering systems respectively to follow the path 32 to the endpoint 35.

While approaching the trailer (at 208) the hitch assist system 10 continues to search for the tongue of the trailer 16 in camera image data 55 at 210. At 210, the tongue 116 is classified by using contour matching in an A-frame or I-frame pattern, or using machine learning or neural network recognition. As the vehicle 12 decreases a distance between the vehicle 12 and the trailer 16, the tongue 116 becomes visually more apparent, due to the decrease in the distance and an angle of perspective of the rear camera 48 disposed on the vehicle 12 being overhead relative to the tongue 116. If, at 210, the tongue 116 is not detected in the image data 55, and the vehicle reaches the distance threshold, at 212, to the trailer 16, the hitch assist system 10 determines that the trailer-like object is not a trailer at 214. The hitch assist system 10 may also detect that conditions, such as lighting, are insufficient to determine a trailer 16 from a trailer-like object by determining a tongue 116 and distance threshold at 210, 212. At 214, the hitch assist system 10 aborts the maneuver if the tongue 116 is not detected and the vehicle 12 is within the first threshold at 210, 212. The operation aborts at 214, and the vehicle is secured, via the steering and braking systems 20, 70, at a standstill or is otherwise not moving. If a tongue 116 is detected at 210, or the vehicle 12 is not within, or is exceeding the distance threshold at 212, the hitch assist system 10 maneuvers (at 208) the vehicle along the path 32. Additionally, if a tongue 116 is not detected at 210, and the vehicle 12 is not within, or has exceeded the distance threshold at 212, the hitch assist system 10 maneuvers the vehicle along the path 32 (at 208). At 216, the hitch assist system 10 determines if the vehicle 12 has traveled the path 32 to the endpoint 35. If, at 216, the hitch assist system 10 determines that the path 32 is not complete at the endpoint 35, the hitch assist system 10 continues to maneuver the vehicle along the path 32 at 208. If, at 216, the hitch assist system 10 determines that the path 32 is complete at the endpoint 35, the hitch assist system 10 ends operation.

Figure 9:
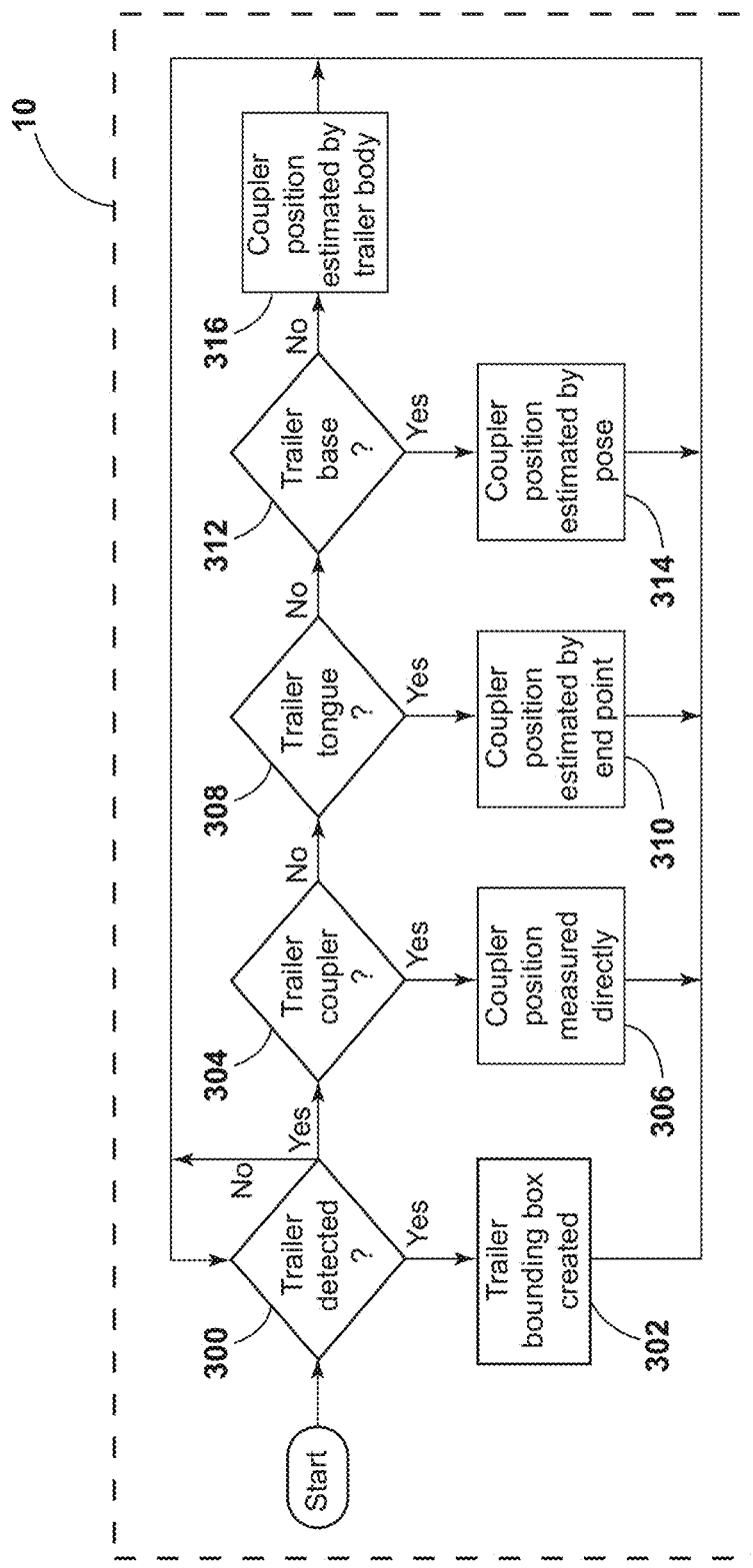
FIG. 9 is control logic flow diagram depicting an implantation of the trailer classification scheme.

FIG. 9 depicts additional control logic showing a classification of the trailer components 110, such as the coupler 14, tongue 116, and base 114 of the trailer 16. Classifying the trailer components 110, as described, may provide a robust and accurate alignment of the hitch ball 34 and coupler 14 at the endpoint 35 of the path 32. Therefore, refined and specific classifications of each of the trailer components 110 may allow for a more precise estimation for the endpoint 35. According to this principle, the hitch assist system 10 utilizes a specific classification to determine, with greater precision, the endpoint 35. Additionally, the hitch assist system 10 is able to create an identifier 118 on the display 44 of the interface 40 for either the trailer 16 or the coupler 14, tongue 116, or base 114 enabled by the classification of each of the trailer components 110. The identifier 118 may be a window, or bounding box that surrounds the trailer 16 or each of the trailer components 110, as shown in FIGS. 7A-7F. The classification control scheme depicted in FIG. 9 used by the hitch assist system 10, performs a progressive classification, as will be explained below in more detail. At 300, the hitch assist system 10 detects the trailer 16. With the trailer 16 detected at 300, the hitch assist system 10 provides the identifier 118 on the display 44 of the interface 40 at 302. At 302, the identifier 118 fully surrounds, or otherwise encapsulates the trailer 16. The identifier 118 created at 302 allows the user to visually observe the trailer 16 detected by the hitch assist system 10. If a trailer 16 is not detected at 300, the user is able to reposition the vehicle 12 until the identifier 118 appears around the trailer 16.

If (at 300) a trailer 16 is detected, the hitch assist system 10 determines a position of the coupler at 304. The position of the coupler at 304 is indicative of the endpoint 35 to which the hitch assist system 10 must maneuver. If (at 304) the hitch assist system 10 detects the coupler 14, the endpoint 35 is set as a center of the coupler 14 at 306. If (at 304) the hitch assist system 10 is unable to detect the coupler 14, the hitch assist system 10 searches for the tongue 116 at 308. The hitch assist system 10 may be unable to detect the coupler 14 (at 304), if the vehicle is too far relative to the trailer 16 for the imaging system 18 to image the coupler 14, or if weather conditions are insufficient (i.e., low lighting), for example. At 308, the hitch assist system 10 searches for the tongue 116 in the image data 55, based on learned appearances for a variety of tongues, such as through database comparison, for example. If (at 308) the tongue 116 is detected, the hitch assist system 10 estimates the path 32 to the endpoint 35 by estimating a position of the coupler 14 using endpoints of the tongue 116 at 310. The hitch assist system 10 calculates the endpoint 35 to be at an end of the tongue 116 minus a nominal, constant value (at 310). If (at 308) the tongue 116 is not detected, the hitch assist system 10 attempts to recognize the base 114 at 312. The imaging system 18 may be trained to characteristics of bases 114, including, for example, two wheels below a deck. The imaging system 18 may be further trained by providing a machine learning image set of trailers 16 from a database.

If (at 312) the base 114 is detected, the hitch assist system 10 estimates a pose, or the heading direction 33, of the trailer 16 at 314. Detecting the heading 33 at 314 allows the hitch assist system 10 to make an estimation of a position of the coupler 14 to set as the endpoint 35 of the path 32 at 314. A lateral position of the base 114 is calculated by the heading 33. As an example, the hitch assist system 10, assuming a heading 33 of 15°, may estimate that the coupler 14 is 40% offset from a center 36 of the base 114 at 314. Rough estimations of coupler position at 314 may be sufficient to allow the hitch assist system 10 to continue maneuvering along the path 32 toward the trailer 16. As the vehicle approaches the trailer 16, clarity of the trailer 16 increases in the image data 55 from the imaging system 18, and a more refined classification, as described above, may become possible. For example, at 6 m, the hitch assist system 10 may only be able to estimate a position of the coupler 14 with the trailer 16. Once it maneuvers within 4 m, the hitch assist system 10 detects the base 114 at 312, for example, and refines an estimation of the coupler position. When within 2 m, the hitch assist system 10 may identify the tongue 116 at 308, adding further refinement to the path 32. Within 1 m, the hitch assist system 10 may classify the coupler to directly determine its position, until the vehicle completes the maneuver. If, at 312, the base 114 is not detected, the hitch assist system 10 estimates the coupler position using the body 112 of the trailer 16 at 316 to calculate the path 32. By performing the refinements in stages, as just described, the hitch assist system 10 avoids abrupt changes in direction, for instance, if the hitch assist system 10 shifts from a rough estimation at 6 m that is used until 1 m, then to a refined estimation. Therefore, path planning becomes smoother and more accurate.

Figure 10:
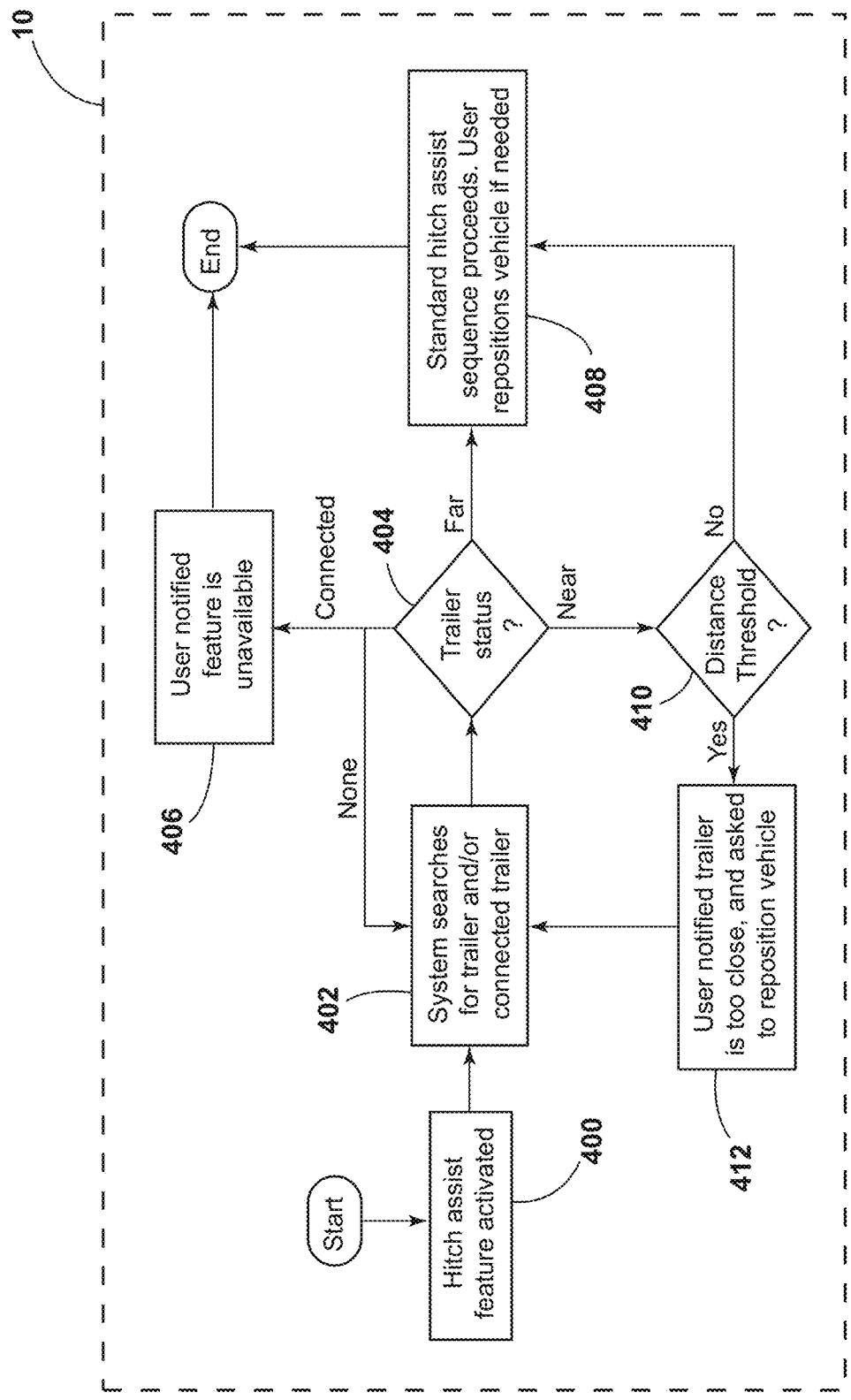
FIG. 10 is a control logic flow diagram depicting integration between the trailer classification scheme with a trailer status control scheme.

FIG. 10 depicts control logic for the hitch assist system 10 to use the classification of the trailer 16 and the trailer components 110 described above to identify a status of the trailer 16. For example, the status of the trailer 16 may be near or connected. At 400, the hitch assist system 10 may be activated either manually by the user, or automatically via detection of the trailer 16, or the trailer-like object.

At 402, the hitch assist system 10 may identify the trailer 16, or the trailer components 110 from the image data 55 using the classification described specifically by FIGS. 8 and 9. On identification of the trailer 16, or trailer-like object, the hitch assist system 10 may determine a status of the trailer 16, or trailer-like object at 404. The hitch assist system 10 is configured to request an update for the trailer status at 404 in real-time, or at every instance a trailer 16 or trailer-like object is detected. At 404, the trailer status is either "none", "connected", "far", or "near". If, at 404, the trailer status is "none" such that no trailer 16 is detected in the image data 55, the hitch assist system 10 continues searching for the trailer 16 or trailer-like object at 402. This allows the user to reposition the vehicle 12, while the hitch assist system 10 continuously searches the image data 55 for the trailer 16 or trailer-like object.

If, at 404, the trailer status is "connected" being indicative of a trailer 16 connected to the vehicle, the hitch assist system 10 may not be available, as the coupler 14 and hitch ball 34 are already aligned, or be within the threshold distance such that hitch assist system 10 will not activate when the trailer 16 is connected to the vehicle 12, and will notify, via the interface 40, the user at 406. The hitch assist system 10 may notify the user either audibly, in which sounds are emitted from the interface 40, visually, in which text or images appear on display 44 of the interface 40, or a combination of both at 406. If, at 404, the status of the trailer 16 is "far" being indicative of the vehicle 12 having a distance exceeding the first threshold from the trailer 16 or trailer-like object, the hitch assist system 10 proceeds with a maneuver along the path 32 at 408. If, at 404, the status of the trailer 16 is "near" being indicative of a distance from the vehicle to the trailer 16 or trailer-like object being within the first threshold, the hitch assist system 10 determines if an estimated distance from the coupler 14 to a position of the vehicle 12 at a standstill is within a second threshold at 410.

Specifically, at 410, the estimated distance of the coupler 14, as projected onto a ground plane, relative to a position of the vehicle 12 at standstill is compared against the second threshold. If (at 410) the estimated distance is greater than, or not within the second threshold, the hitch assist system 10 proceeds as described at 408. If (at 410) the estimated distance is less than the second threshold, the hitch assist system 10 does not have enough travel distance to provide a successful, automated maneuver. The user is notified at 412 that the trailer 16 is too close, and that the vehicle 12 must be driven forward to use the hitch assist system 10. As stated above, the hitch assist system 10 may be used to search for the trailer 16 or trailer-like object at 402 during repositioning. Again, as described above, the notification at 412 may be audible, visual, or a combination of both audible and visible information.

Figure 11B:
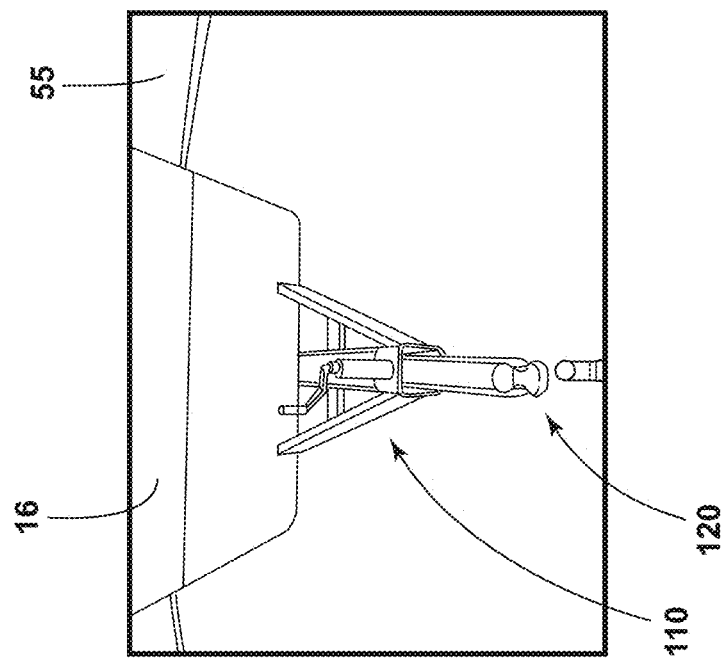
FIGS. 11A-11B are rear, perspective views of a trailer having a near and a connected status, respectively.
Figure 11A:
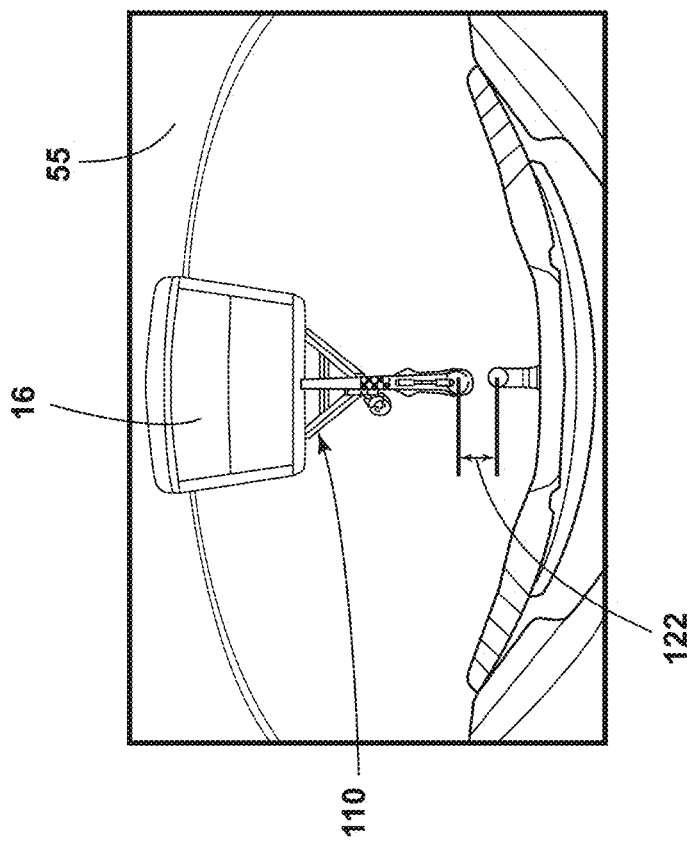

Referring specifically to FIGS. 11A-11B, rear perspective views are shown depicting two classified trailers 16 having identified trailer components 110 indicative of a status of the trailer 16, being "near" or "connected", respectively. The hitch assist system 10 will deny activation if a trailer 16 is connected, but allow activation otherwise and, as will be described in more detail below, a trailer backup assist system (not shown) has an inverse logic. As depicted in FIGS. 11A-11B, the hitch assist system 10 uses the image data 55 from the rear camera 48 to detect an overlap condition 120 between the tongue 116, and the hitch ball 34. If an overlap condition 120 does exist, as shown in FIG. 11B, the hitch assist system 10 reports a status of the trailer 16 as "connected". If the hitch ball 34 and tongue 116 show no overlap, as depicted in FIG. 11A, the hitch assist system 10 determines a trailer 16 is "near", but not connected to the hitch ball 34. Additionally, the hitch assist system 10 is able to utilize the status of the trailer 16 being "near", in conjunction with the second threshold, to notify the user that the trailer 16 is too close to the vehicle 12, and coach the user to drive forward. The hitch assist system 10 requires a minimum distance, or the first threshold, in which the minimum distance, or first threshold, is greater than the second threshold, to control the vehicle 12 accurately. Additionally, the hitch assist system 10 may be preferred to activate during a vehicle standstill, as described.

Determination of the status of the trailer 16 does not require vehicle motion, which provides a significant enhancement to systems that require vehicle movement, for example, using the radar to detect the trailer 16 behind the vehicle. As such, the hitch assist system 10 and the trailer backup assist system (not shown) benefit through being activated during vehicle standstill. Current methods to detect a status of the trailer 16 being connected include drawbacks, such as reliance on an electrical connector (not shown), which overlooks a trailer 16 connected without the electrical connector such as, for example, during boat launch or, conversely, an auxiliary device may be plugged into the electrical connector, which is not a trailer 16. Additionally, reliance on detection of the tongue 116 is effective, even during vehicle standstill, but does not differentiate the status of the trailer 16 as between "connected" and "near". Detecting a status of the trailer 16 further aids to improve the hitch assist system 10 described above, and thus provides an enhancement to detect a status of the trailer 16, being either "near" shown in FIG. 11A or "connected" shown in FIG. 11B. Incorporation of a detected status of the trailer 16 decreases errors, such as wrongly allowing or inhibiting activation of the hitch assist system 10 or the trailer backup assist system (not shown).

Figure 12:
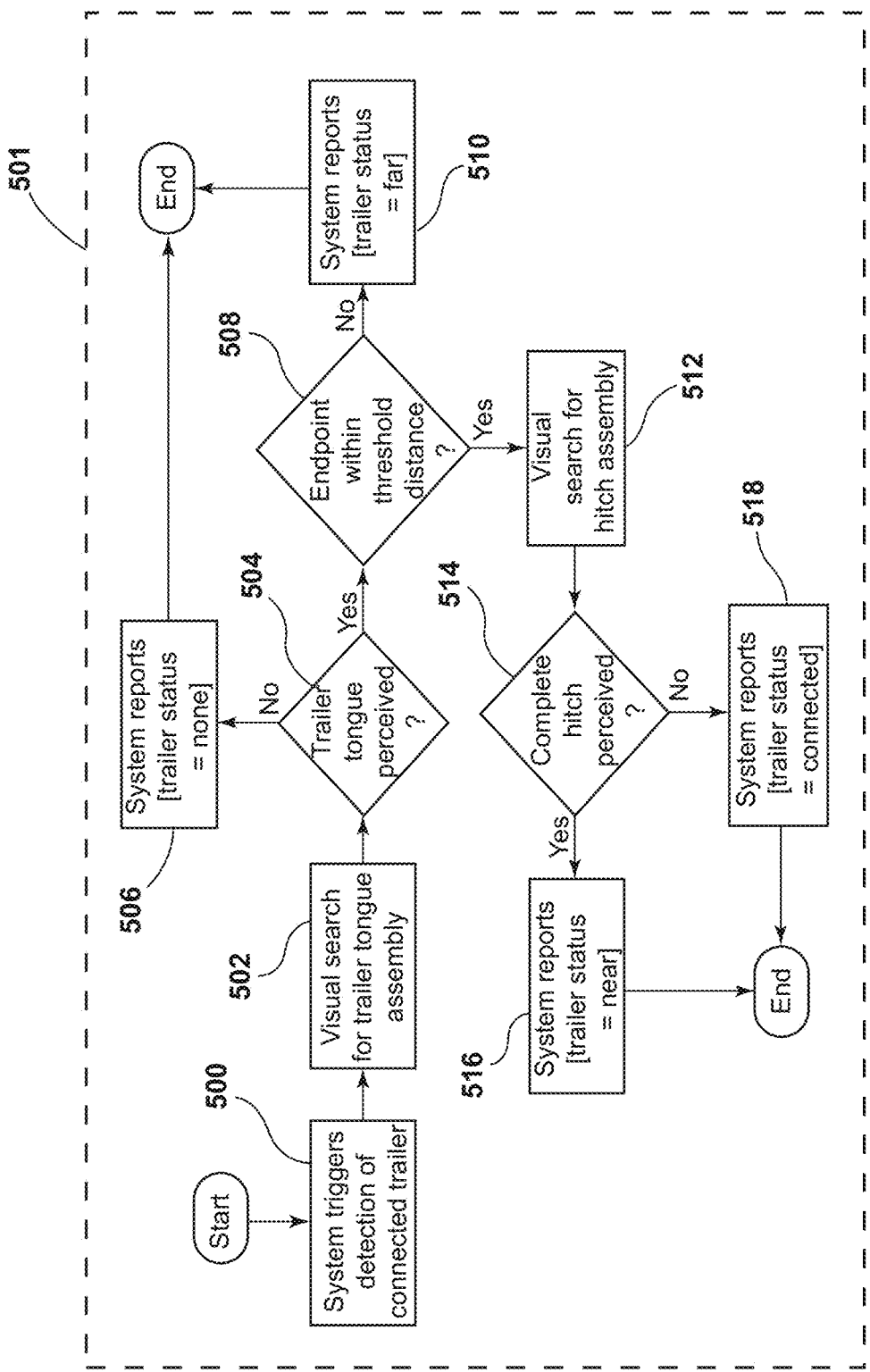
FIG. 12 is a control logic flow diagram depicting an implementation of a trailer status control scheme.

FIG. 12 depicts control logic for a trailer backup assist system 501 integrating the trailer and trailer component classification from the hitch assist system 10. Several vehicle control sub-systems may wish to utilize the status of the trailer 16. As such, any vehicle control sub-system may request that the trailer backup assist system 501 evaluate the status of a trailer 16 behind the vehicle 12. For instance, at 500, at a start of the hitch assist system 10, described above, the trailer backup assist system 501 is activated, and instructed to make an evaluation of a status of the trailer 16 detected by the hitch assist system 10. At 502, the trailer backup assist system processes image data 55 from the rear view camera 48 of the image system 18 to detect the tongue 116 of the trailer 16. The trailer backup assist system 501 may detect (at 502) a shape and position of the tongue 116, through a neural network or similar strategy, for example. At 504, the trailer backup assist system 501 decides if a tongue 116 can be perceived in the image data 55 from the imaging system 18. If, at 504, a tongue 116 is not detected in the image data 55, the trailer backup assist system 501 sets the status of the trailer 16 to "none" at 506. This status signal is used by vehicle control sub-systems to make feature-relevant decisions and will be discussed below in more detail.

If (at 504) a tongue 116 is perceived in the image data 55, the trailer backup assist system 501 determines if a position of the tongue 116, specifically an endpoint approximate to a bottom portion of an image from the image data 55, is proximate the vehicle 12 at 508. The second threshold may be used to delineate the status of the trailer 16 being "far" or "not far". Again, the second threshold may be applied as either a pixel position on the camera 48 (i.e., at pixel position 500 or greater is considered "far"), or an estimated distance on the ground plane (i.e., an estimate of 1 m or greater from the trailer 16 is considered "far"). If, at 508, a distance between the vehicle 12 and the endpoint 35 is greater than the second threshold, the trailer backup assist system 501 reports the status of the trailer 16 as being "far" at 510. If, at 508, a distance between the vehicle 12 and the endpoint 35 of the tongue 116 is less than the second threshold, the trailer backup system 501 activates the hitch assist system 10 to search for hitch ball 34, as described at 512.

At 514, the trailer backup assist system 501 determines if the hitch ball 34 is perceived in the image data 55 as being indicative of a complete hitch assembly. If (at 514) the tongue 116 is connected to, or has an overlap condition 120 with the hitch ball 34, the trailer backup assist system 501 will not be able to distinguish the hitch ball 34 in the image data 55. The hitch ball 34 may only be considered completely perceived (at 514) if a gap 122, depicted in FIG. 11A is detected in the image data 55, and exists between the hitch ball 34 and the tongue 116 above a pixel threshold. If (at 514) the trailer backup assist system 501 detects the complete hitch ball 34 in the image data 55, the trailer 16 is considered "near" to the vehicle 12, but not "connected," and the trailer backup assist system 501 reports the status of the trailer 16 as "near" at 516. If, at 514, the trailer backup assist system 501 does not detect a hitch ball 34 in the image data 55 being indicative of an overlap condition 120, the trailer 16 is considered as "connected," and the status is reported as "connected" at 518. This is an incomplete assessment, however, as the trailer 16 may be hovering above the hitch ball 34, for example. Therefore, an associated confidence factor is also reported at 518 to determine if the trailer 16 is physically connected as the trailer backup assist system 501 determines.

Figure 13:
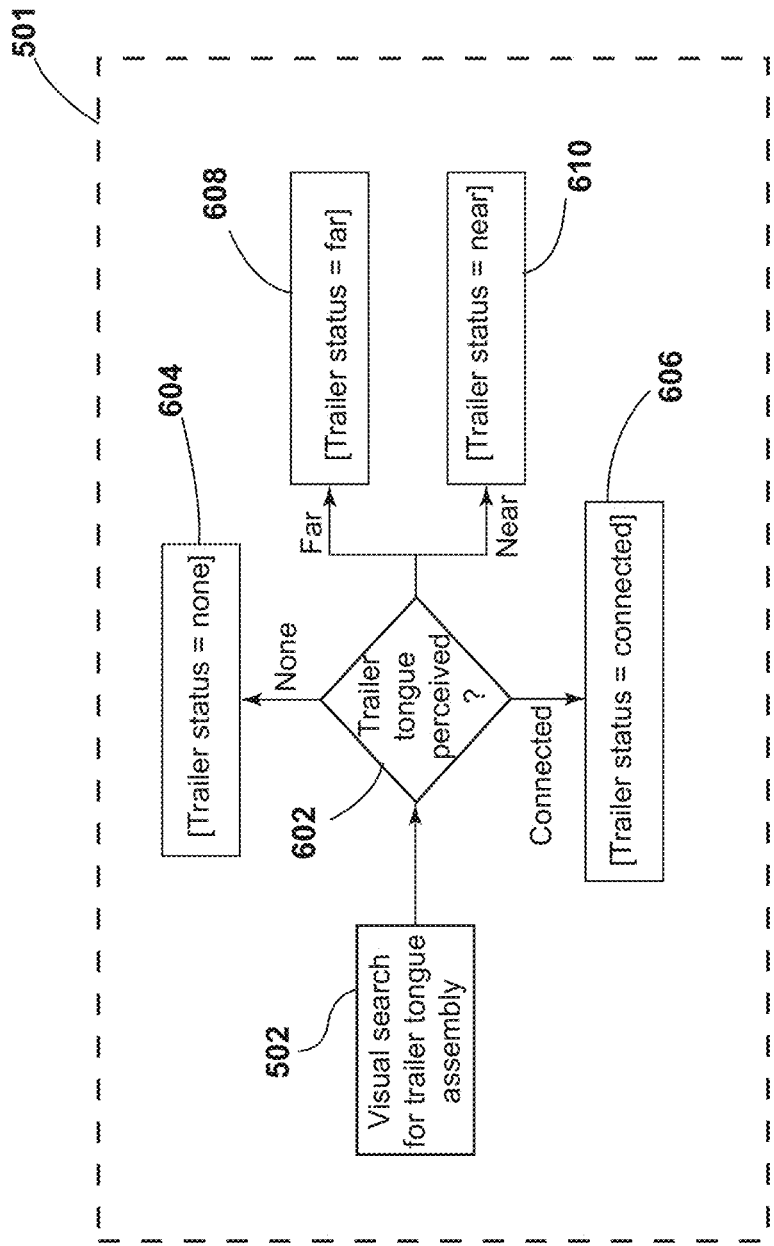
FIG. 13 is control logic flow diagram depicting an alternative implementation of the trailer status control scheme.

FIG. 13 depicts alternate control logic for outputting a status of the trailer from the trailer 16 backup assist system 501. An alternate embodiment exists that uses neural networks, or deep learning to associate instances of a status being "connected" and "near". For example, the trailer backup assist system 501 may be programmed with pre-stored image data indicative of thousands of manually classified images with each of the statuses as "none", "near", "far", and "connected". This teaches the trailer backup assist system 501 and appearance of each of the statuses, and allows the trailer backup assist system 501 to make a judgment on a new, unique scenario based on the associated instances. For example, instead of perceiving a tongue 116 at 504, estimating the endpoint 35 at 508, and perceiving the hitch ball 34 at 514 from FIG. 12, the trailer backup assist system 501 determines the status of the trailer 16 (at 602) by using the associated instances, if a tongue 116 is detected in the image data 55 (at 502) in FIG. 12. The trailer backup assist system 501 outputs, at 604, 606, 608, and 610 each of the statuses of the trailer 16 based on the judgement of the trailer backup assist system 501 from the associated instances. Additionally, the instance depicted in FIG. 13 may be combined with other systems to determine the status of the trailer 16.

Figure 14:
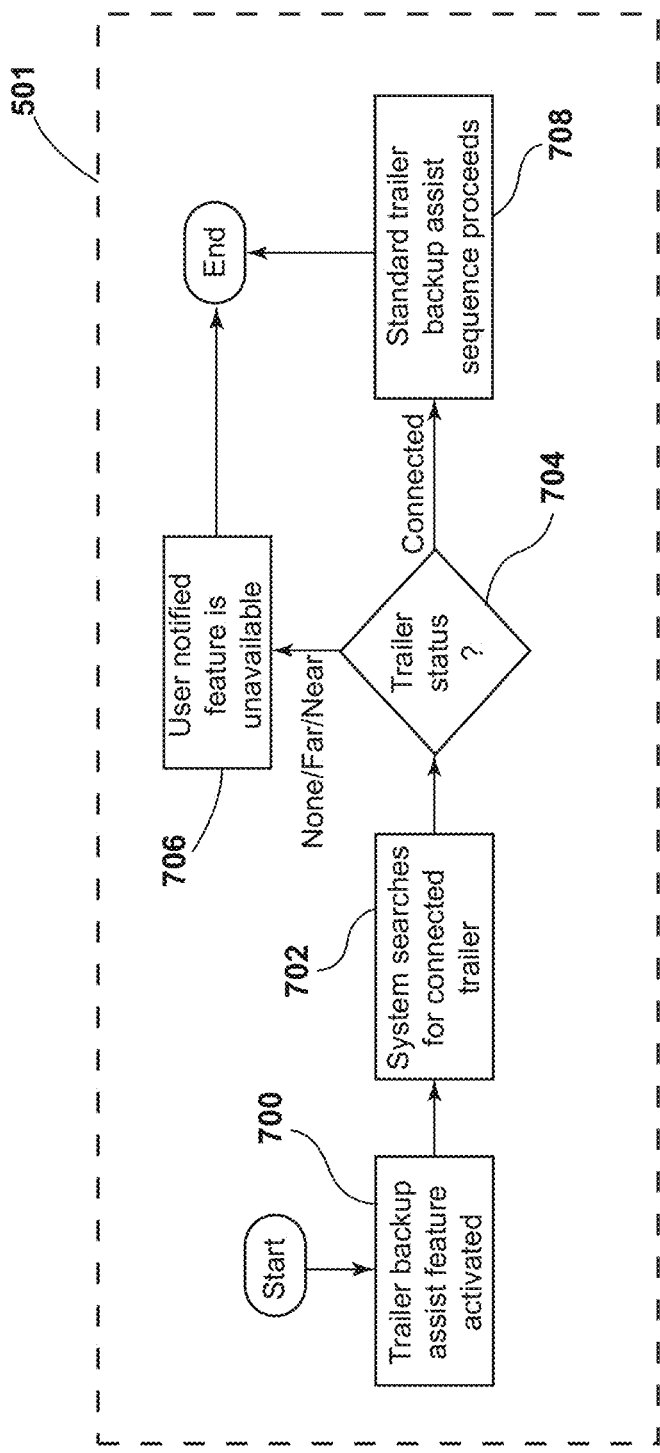
FIG. 14 is a control logic flow diagram depicting an implementation of the trailer status control scheme.

FIG. 14 depicts control logic for the trailer backup assist system 501 to implement the status of the trailer 16. This logic shows how the trailer backup assist system 501 uses the trailer status, after activation. At 700, the trailer backup assist system 501 requests a status of the trailer 16. The request at 700 may be sent in real-time, or near-instantaneous. At 702, the trailer backup assist system 501 searches for a trailer 16, as described. At 704, the trailer backup assist system 501 determines the status of the trailer 16 as described. At 704, the trailer backup assist system 501 determines a status of the trailer 16 as either "none", "connected", "near", or "far". If, at 704, a trailer 16 is not connected to the vehicle 12 and the status is either "none", "far", or "near", the trailer backup assist system 501 cannot proceed. At 706, the user is notified to connect the trailer 16 before reattempting to use the trailer backup assist system 501. Again, as described above, the notification to the user at 706 may be audible, visual, or a combination of audible and visible notifications on the display 44 of the interface 40. If (at 704) the hitch assist system 10 determines the status of the trailer 16 as connected, the trailer backup assist system 501 proceeds with an operation or maneuver at 708. Shown and described above, the present disclosure integrates a hitch assist system 10 with a trailer backup assist system 501 to automate maneuvering toward, and determining the status of the trailer 16.

It is to be understood that variations and modifications can be made on the aforementioned system and related structures without departing from the concepts of the present disclosure, and further it is to be understood that such concepts are intended to be covered by the following claims unless these claims by their language expressly state otherwise.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A system for assisting in aligning a vehicle for hitching with a trailer comprising:
    a steering system that adjusts a steering angle of the vehicle;
    a braking system that adjusts a speed of the vehicle;
    an imaging system that outputs image data of an area proximate the vehicle and including a trailer-like object; and
    a controller that:
        evaluates the trailer-like object to determine if the trailer-like object is a trailer;
        detects, within a first threshold distance defined from a stationary point on the vehicle and the trailer, a position of a coupler within the image data;
        detects, responsive to the position being less than the first threshold distance, a status of the trailer based on the image data being indicative of a position of a hitch ball relative to the coupler within a second threshold distance;
        maneuvers, via the steering and braking systems, the vehicle based on the status; and
        responsive to the evaluation including a trailer-like object defining a contour mismatch and the position being greater than the first threshold distance, detects a base, via an estimation of a pose in the image data of the trailer-like object.

2. The system of claim 1, wherein the controller classifies the image data based on the evaluation and initiates vehicle movement approaching the trailer-like object, wherein the evaluation is indicative of the image data including a trailer with a confidence level assigned during the evaluation exceeding a threshold level.

3. The system of claim 2, wherein the controller detects a tongue, via contour matching, in the image data of the trailer-like object responsive to the evaluation being indicative of the image data including a trailer with a confidence level assigned during the evaluation exceeding the threshold level such that, responsive to the tongue in the image data, the controller establishes the trailer-like object as a trailer.

4. The system of claim 3, wherein the controller activates the braking system responsive to the evaluation including a trailer-like object defining a contour mismatch of the tongue and the position being less than the first threshold distance.

5. The system of claim 1, wherein the controller, responsive to the estimation being indicative of the image data including a trailer with the confidence less than the threshold level, maneuvers to the position based on a body of the trailer-like object identified in the image data.

6. The system of claim 1, wherein the status is determined through association of the image data with predetermined image data being indicative of each of the statuses and stored in the controller.

7. A hitch assist system for a vehicle comprising:
    an imaging system that receives image data of a trailer-like object disposed in an area proximate a vehicle hitch; and
    a controller that:
        classifies the image data based on an evaluation of the trailer-like object and initiates vehicle movement approaching the trailer-like object, wherein the evaluation is indicative of the image data including a trailer with a confidence level assigned during the evaluation and exceeding a threshold level;
        detects a tongue associated with the trailer-like object, via contour matching, in the image data such that, responsive to the tongue in the image data, the controller establishes the trailer-like object as a trailer, and that detects, within a first threshold distance defined from a stationary point on the vehicle and the trailer, a position of a coupler from the image data and maneuvers, via the steering and braking systems, the vehicle based on the position; and
        activates the braking system responsive to the evaluation including the trailer-like object defining a contour mismatch of the tongue and the position being less than the first threshold distance.

8. The hitch assist system of claim 7, wherein the controller, responsive to the evaluation including a trailer-like object defining a contour mismatch and the position being greater than the first threshold distance, detects a base, via an estimation of a pose in the image data of the trailer-like object.

9. The hitch assist system of claim 8, wherein the controller, responsive to the estimation being indicative of the image data including a trailer with the confidence less than the threshold level, maneuvers to the position based on a body of the trailer-like object identified in the image data.

10. The hitch assist system of claim 7, wherein the controller further detects, responsive to the position being less than the first threshold distance, a status of the trailer based on the image data being indicative of a position of a hitch ball relative to the coupler compared to a second threshold distance, and maneuvers, via the steering and braking systems, the vehicle based on the status.

11. The hitch assist system of claim 10, wherein the status is determined through association of the image data with predetermined image data indicative of each of the statuses being stored in the controller.

12. The hitch assist system of claim 7, wherein the first threshold distance is indicative of a distance from a center point of the hitch ball to a center point of the coupler.

13. A hitch assist system for a vehicle comprising:
a steering system that adjusts a steering angle of the vehicle;
a braking system that adjusts a speed of the vehicle;
an imaging system that outputs image data of an area proximate the vehicle and includes a trailer-like object; and
a controller that:
evaluates the trailer-like object to determine if the trailer-like object is a trailer;
detects, within a first threshold distance defined from a stationary point on the vehicle and the trailer, a position of a coupler within the image data;
classifies the image data from the evaluation being indicative of the image data being a trailer with a confidence level assigned during the evaluation exceeding a threshold level and initiates vehicle movement approaching the trailer-like object;
detects a tongue, via contour matching, in the image data of the trailer-like object such that, responsive to the tongue in the image data, the controller establishes the trailer-like object as a trailer;
maneuvers, via the steering and braking systems, the vehicle based on the position of the coupler within the image data;
detects, responsive to the position being less than the first threshold distance, a status of the trailer based on the image data being indicative of a position of a hitch ball relative to the coupler within a second threshold distance; and
maneuvers, via the steering and braking systems, the vehicle based on the status.

14. The hitch assist system of claim 13, wherein the controller activates the braking system responsive to the trailer-like object defining a contour mismatch of the tongue and the position being less than the first threshold distance.

15. The hitch assist system of claim 13, wherein the status is determined through association of the image data with predetermined image data of each of the statuses stored in the controller.

16. The hitch assist system of claim 13, wherein the first threshold distance is indicative of a distance from a center point of the hitch ball to a center point of the coupler.

17. The hitch assist system of claim 13, wherein the controller displays, on an interface, the trailer from the image data such that an identifier highlights the trailer, wherein the identifier is adjustable on a display of the interface.

18. The method for aligning a vehicle for hitching with a trailer of claim 17, wherein the controller adjusts the identifier being a window that surrounds the trailer such that the window is moveable to individual trailer components detected by the controller.

* * * * *